(12) United States Patent
Poon et al.

(10) Patent No.: US 10,746,994 B2
(45) Date of Patent: Aug. 18, 2020

(54) SPHERICAL MIRROR HAVING A DECOUPLED ASPHERIC

(71) Applicant: Microsoft Technology Licensing, LLC, Redmond, WA (US)

(72) Inventors: Yarn Chee Poon, Redmond, WA (US); Joshua A Hudman, Issaquah, WA (US); R Andrew Wall, Bellevue, WA (US); Scott McEldowney, Redmond, WA (US); Steven John Robbins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 14/454,048

(22) Filed: Aug. 7, 2014

(65) Prior Publication Data
US 2016/0041390 A1    Feb. 11, 2016

(51) Int. Cl.
*G02B 27/01*   (2006.01)
*G02B 3/04*   (2006.01)
(Continued)

(52) U.S. Cl.
CPC ........... *G02B 27/0172* (2013.01); *G02B 3/04* (2013.01); *G02B 5/10* (2013.01); *G02B 5/3083* (2013.01);
(Continued)

(58) Field of Classification Search
None
See application file for complete search history.

(56) References Cited

U.S. PATENT DOCUMENTS 2,645,974 A * 7/1953 Ito ........................ G02B 13/04
                                                         359/753
3,980,399 A * 9/1976 Howden ............. B24B 13/0043
                                                         359/718
(Continued)

FOREIGN PATENT DOCUMENTS

WO          9521396 A3     8/1995
WO       2009094399 A1     7/2009

OTHER PUBLICATIONS

"HMD and Micro-displays", Retrieved Date: Feb. 11, 2014 Available at: http://www.loreti.it/Download/PDF/SLM/HMDs%20and%20Microdisplays%20Basics.pdf.
(Continued)

*Primary Examiner* — Matthew Yeung
(74) *Attorney, Agent, or Firm* — Alleman Hall Creasman & Tuttle LLP

(57) ABSTRACT

The technology provides decoupling an aspheric optical element from a birdbath optical element in a near-eye display (NED) device. One or more aspheric lens are used with a spherical birdbath reflective mirror in a projection light engine of a NED device. A projection light engine provides image light (or other information), by way of the spherical birdbath reflective mirror and at least one aspheric lens, to a near-eye display of the NED device. The spherical birdbath reflective mirror collimates and reflects the image light to an exit pupil external to the projection light engine. Decoupling the aspheric optical element from the spherical birdbath reflective mirror may enable high modulation transfer function (MTF) and improved manufacturability of the projection light engine. The NED device having aspheric optical elements decoupled from a birdbath optical element may be positioned by a support structure in a head-mounted display (HMD) or head-up display (HUD).

20 Claims, 13 Drawing Sheets

(51) Int. Cl.
- G02B 5/10 (2006.01)
- G02B 5/30 (2006.01)
- G02B 17/08 (2006.01)
- G02B 27/28 (2006.01)
- G02B 27/42 (2006.01)

(52) U.S. Cl.
CPC ........... *G02B 17/08* (2013.01); *G02B 27/283* (2013.01); *G02B 27/4205* (2013.01); *G02B 2027/011* (2013.01); *G02B 2027/0178* (2013.01)

(56) References Cited

U.S. PATENT DOCUMENTS

| | | | | |
|---|---|---|---|---|
| 5,579,161 | A * | 11/1996 | Sekiguchi | G02B 27/0101 359/559 |
| 5,822,129 | A * | 10/1998 | Sekine | G02B 13/04 359/649 |
| 5,907,416 | A * | 5/1999 | Hegg | G02B 27/0025 359/14 |
| 5,986,816 | A * | 11/1999 | Shikama | G02B 25/001 359/644 |
| 5,991,084 | A * | 11/1999 | Hildebrand | G02B 27/0101 359/629 |
| 6,094,181 | A | 7/2000 | Hildebrand et al. | |
| 6,097,543 | A | 8/2000 | Rallison et al. | |
| 6,118,414 | A | 9/2000 | Kintz | |
| 6,144,503 | A * | 11/2000 | Sugano | G02B 13/06 348/E5.137 |
| 6,903,875 | B2 | 6/2005 | Achtner | |
| 7,158,215 | B2 | 1/2007 | Harned et al. | |
| 7,586,686 | B1 | 9/2009 | Hall | |
| 8,482,859 | B2 | 7/2013 | Border et al. | |
| 2004/0233547 | A1 * | 11/2004 | Sugano | G02B 13/04 359/784 |
| 2005/0117128 | A1 * | 6/2005 | Kodama | G02B 27/102 353/103 |
| 2006/0098293 | A1 * | 5/2006 | Garoutte | G02B 27/0172 359/630 |
| 2008/0007822 | A1 * | 1/2008 | Dodoc | G03F 7/70225 359/365 |
| 2012/0013988 | A1 | 1/2012 | Hutchin | |
| 2012/0123742 | A1 | 5/2012 | Harrison et al. | |
| 2012/0170131 | A1 * | 7/2012 | Hengster | C03B 19/1469 359/642 |
| 2014/0211322 | A1 | 7/2014 | Bohn et al. | |
| 2015/0346495 | A1 * | 12/2015 | Welch | G02B 27/0172 345/8 |

OTHER PUBLICATIONS

Urey, et al., "Optics designs and system MTF for laser scanning displays", In Proceedings of Helmet and Head-Mounted Displays IV, vol. 3689, Apr. 1999, 11 pages.

Choi, et al., "Development of High-Performance Optical System for Small Satellites", In Proceedings-Spie the International Society for Optical Engineering, vol. 6677, Retrieved on: Feb. 11, 7 pages.

"International Search Report & Written Opinion Issued in PCT Application No. PCT/US2015/043889", dated Oct. 15, 2015, 10 Pages.

"Office Action Issued in European Patent Application No. 15749954.2", dated Apr. 12, 2018, 3 Pages.

"First Office Action and Search Report Issued in Chinese Patent Application No. 201580042537.7", dated Feb. 8, 2018, 15 Pages.

"Second Office Action Issued in Chinese Patent Application No. 201580042537.7", dated Oct. 24, 2018, 12 Pages.

"Third Office Action Issued in Chinese Patent Application No. 201580042537.7", dated Apr. 25, 2019, 16 Pages.

"Summons to Attend Oral Proceedings Issued in European Patent Application No. 15749954.2", dated Jul. 25, 2019, 6 Pages.

* cited by examiner

SPHERICAL MIRROR HAVING A DECOUPLED ASPHERIC

BACKGROUND

A near-eye display (NED) device may be worn by a user for experiences such as an augmented reality (AR) experience and a virtual reality (VR) experience. A NED device may include a projection light engine that may provide a computer-generated image (CGI), or other information, in a near-eye display of the NED device. In an AR experience, a near-eye display of a NED device may include optical see-through lens to allow a CGI to be superimposed on a real-world view of a user.

A NED device may be included in a head-mounted display (HMD) or head-up display (HUD). A HMD may include a NED device in a helmet, visor, glasses, and goggles or attached by one or more straps. HMDs may be used in at least aviation, engineering, science, medicine, computer gaming, video, sports, training, simulations and other applications. HUDs may be used in at least military and commercial aviation, automobiles, computer gaming, and other applications.

SUMMARY

The technology provides embodiments of decoupling an aspheric optical element from a birdbath optical element in a near-eye display (NED) device. For example, one or more aspheric lens are used with a spherical birdbath reflective mirror in a projection light engine of the NED device. A projection light engine provides image light (or information), by way of the spherical birdbath reflective mirror and at least one aspheric optical elements, to a near-eye display of the NED device. The spherical birdbath reflective mirror collimates and reflects the image light to an exit pupil external to the projection light engine. Decoupling the aspheric optical element from the spherical birdbath reflective mirror may enable high modulation transfer function (MTF) and improved manufacturability of the projection light engine. The NED device having aspheric optical elements decoupled from a birdbath optical element may be disposed by a support structure of a head-mounted display (HMD) or head-up display (HUD).

The technology provides one or more embodiments of a NED device. A projection light engine embodiment includes an apparatus comprising a display to provide image light to a beam splitter that splits the image light. A birdbath optical element receives the image light from the beam splitter and reflects as well as collimates the image light. At least one aspheric optical element is disposed in an optical path between the birdbath optical element and an exit pupil to correct an aberration in the image light.

The technology provides one or more embodiments of a method comprising directing image light along a first optical path to a birdbath reflective mirror. A birdbath reflective mirror collimates and reflects the image light along a second optical path to an exit pupil outside a housing of the birdbath reflective mirror. The image light is polarized in at least one of the first optical path and the second optical path. An optical aberration of the image light is corrected by an aspheric optical element disposed along the second optical path.

The technology also provides one or more embodiments including a computing system and a head-mounted display having a near-eye display. An apparatus comprises a computer system that provides an electronic signal representing image data. A head-mounted display provides image data in response to the electronic signal. The head-mounted display includes a near-eye display device having a projection light engine and near-eye display. The projection light engine provides the image data in response to the electronic signal. A reflective surface in the projection light engine reflects the image data from the microdisplay. A polarizing beam splitter, also in the projection light engine, then polarizes and splits a beam of the image data from the reflective surface. A spherical birdbath mirror reflects and collimates the image data, from the polarizing beam splitter, to an exit pupil external to the projection light engine. An aspheric meniscus lens that may be in the projection light engine then correct the image data. The near-eye display includes a waveguide to receive the image data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The technology provides embodiments of decoupling an aspheric optical element from a birdbath optical element in near-eye display (NED) device. For example, one or more aspheric lens are used with a spherical birdbath reflective mirror in a projection light engine. A projection light engine provides image light (or information), by way of the spherical birdbath reflective mirror and at least one aspheric optical element, into a near-eye display of the NED device. The spherical birdbath reflective mirror collimates and reflects the image light to an exit pupil external to the projection light engine. The NED device having aspheric optical elements decoupled from a birdbath optical element may be included in a projection light engine disposed by a support structure of a HMD or HUD.

Typically, spherical birdbath reflective mirrors include aspheric optical elements to correct for optical aberrations so the mirrors may obtain high MTF. However, these mirrors having aspheric optical elements may be sensitive to surface errors in manufacturing and/or assembly tolerance errors that can degrade MTF. High sensitivity to surface errors and assembly tolerances may limit high-volume (yield) manufacturing of the spherical birdbath reflective mirrors. Sensitivity to surface and assembly tolerance errors may be reduced by removing aspheric optical elements from the mirror and providing them elsewhere, or on other lenses, in a projection light engine as describe herein.

A projection light engine having a decoupled aspheric optical element and spherical birdbath reflective mirror may have a higher MTF and reduced image distortion when used in a larger field of view (FOV) and faster NED device system. Other advantages may include, but are not limited to: 1) enabling spherical birdbath reflective mirrors to be manufactured having higher performance and higher manufacturing yields as they do not need to include aspheric elements; 2) reducing tolerance errors by having the aspheric optical element in the transmission optical path; and 3) moving the aspheric optical element to other positions or surfaces may distribute tolerances so as to aid in sensitivities of other optical elements.

Figure 1:
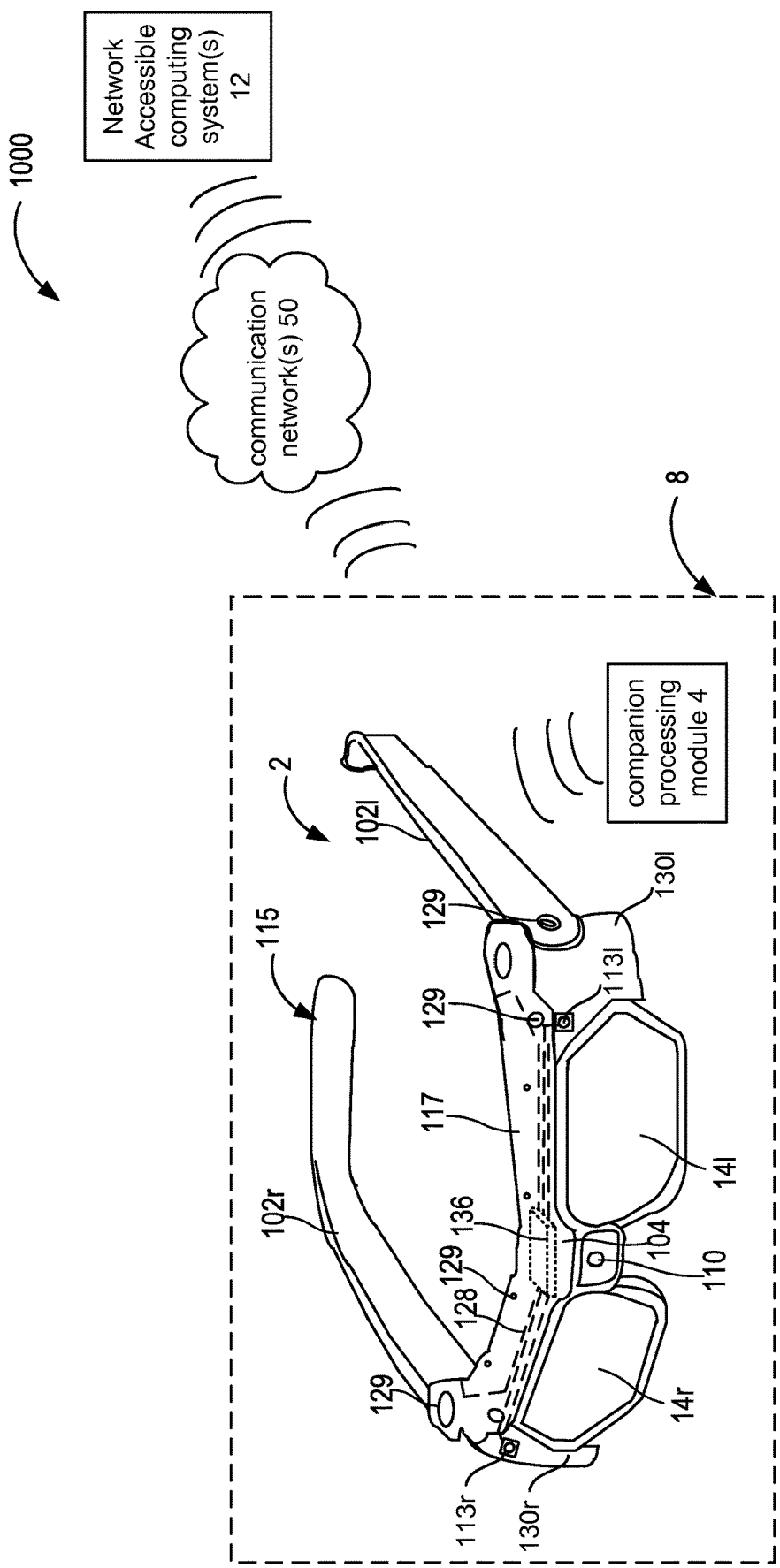
FIG. 1 is a block diagram depicting example components of an embodiment of a near-eye display (NED) device system.

FIG. 1 is a block diagram depicting example components of an embodiment of a near-eye display (NED) device system 8. In the illustrated embodiment, a NED device system 8 includes a near-eye display (NED) device in a head-mounted display (HMD) device 2 and companion processing module 4. HMD 2 is communicatively coupled to companion processing module 4. Wireless communication is illustrated in this example, but communication via a wire between companion processing module 4 and HMD 2 may also be implemented. In an embodiment, HMD 2 includes a NED device having a projection light engine 120 (shown in FIGS. 2B and 3A-D and F-G) and near-eye display 14 having a waveguide as described in detail herein. In alternate embodiments, a NED device may be included in a head-up display (HUD).

In this embodiment, HMD 2 is in the shape of eyeglasses having a frame 115, with each display optical system 14l and 14r positioned at the front of the HMD 2 to be seen through by each eye when worn by a user. Each display optical system 14l and 14r is also referred to as a display or near-eye display 14, and the two display optical systems 14l and 14r together may also be referred to as a display or near-eye display 14. In this embodiment, each display optical system 14l and 14r uses a projection display in which image data (or image light) is projected into a user's eye to generate a display of the image data so that the image data appears to the user at a location in a three dimensional field of view in front of the user. For example, a user may be playing a shoot down enemy helicopter game in an optical see-through mode in his living room. An image of a helicopter appears to the user to be flying over a chair in his living room, not between optional lenses 116 and 118, shown in FIG. 2B, as a user cannot focus on image data that close to the human eye.

In this embodiment, frame 115 provides a convenient eyeglass frame holding elements of the HMD 2 in place as well as a conduit for electrical connections. In an embodiment, frame 115 provides a NED device support structure for a projection light engine 120 and a near-eye display 14 as described herein. Some other examples of NED device support structures are a helmet, visor frame, goggles support or one or more straps. The frame 115 includes a nose bridge 104, a front top cover section 117, a respective projection light engine housing 130 for each of a left side housing (130l) and a right side housing (130r) of HMD 2 as well as left and right temples or side arms 102l and 102r which are designed to rest on each of a user's ears. In this embodiment, nose bridge 104 includes a microphone 110 for recording sounds and transmitting audio data to control circuitry 136. On the exterior of the side housing 130l and 130r are respective outward facing cameras 113l and 113r which capture image data of the real environment in front of the user for mapping what is in a FOV of a near-eye display (NED) device.

In this embodiment, dashed lines 128 are illustrative examples of some electrical connection paths which connect to control circuitry 136, also illustrated in dashed lines. One dashed electrical connection line is labeled 128 to avoid overcrowding the drawing. The electrical connections and control circuitry 136 are in dashed lines to indicate they are under the front top cover section 117 in this example. There may also be other electrical connections (not shown) including extensions of a power bus in the side arms for other components, some examples of which are sensor units including additional cameras, audio output devices like earphones or units, and perhaps an additional processor and memory. Some examples of connectors 129 as screws are illustrated which may be used for connecting the various parts of the frame together.

Figure 7:
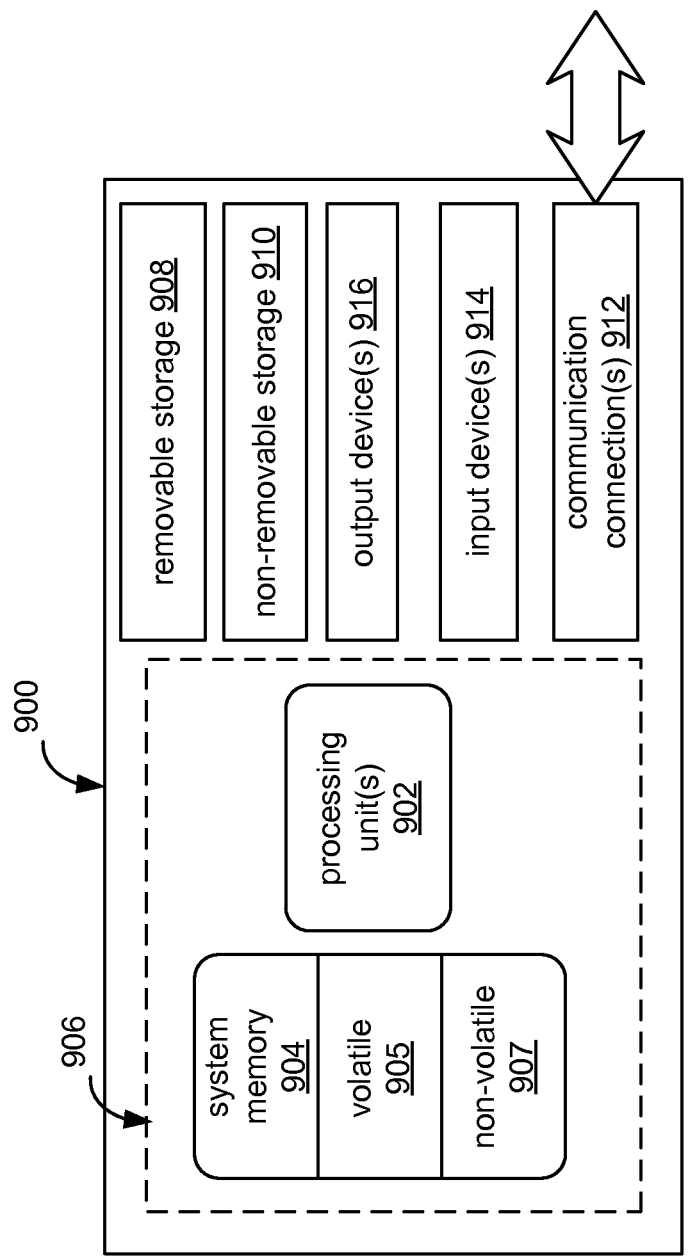
FIG. 7 is a block diagram of one embodiment of a computer system that can be used to implement a network

The companion processing module 4 may take various embodiments. In some embodiments, companion processing module 4 is in a portable form which may be worn on the user's body, e.g. a wrist, or be a separate portable computer system like a mobile device (e.g. smartphone, tablet, laptop). The companion processing module 4 may communicate using a wire or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 50 to one or more network accessible computing system(s) 12, whether located nearby or at a remote location. In other embodiments, the functionality of the companion processing module 4 may be integrated in software and hardware components of HMD 2. Some examples of hardware components of the companion processing module 4 and network accessible computing system(s) 12 are shown in FIG. 7.

One or more network accessible computing system(s) 12 may be leveraged for processing power and remote data access. The complexity and number of components may vary considerably for different embodiments of the network accessible computing system(s) 12 and the companion processing module 4. In an embodiment illustrated in FIG. 1, a NED device system 1000 may include near-eye display (NED) device system 8 (with or without companion processing module 4), communication(s) network 50 and network accessible computing system(s) 12. In an embodiment, network accessible computing system(s) 12 may be located remotely or in a Cloud operating environment.

Image data is identified for display based on an application (e.g. a game or messaging application) executing on one or more processors in control circuitry 136, companion processing module 4 and/or network accessible computing system(s) 12 (or a combination thereof) to provide image data to near-eye display 14.

Figure 2A:
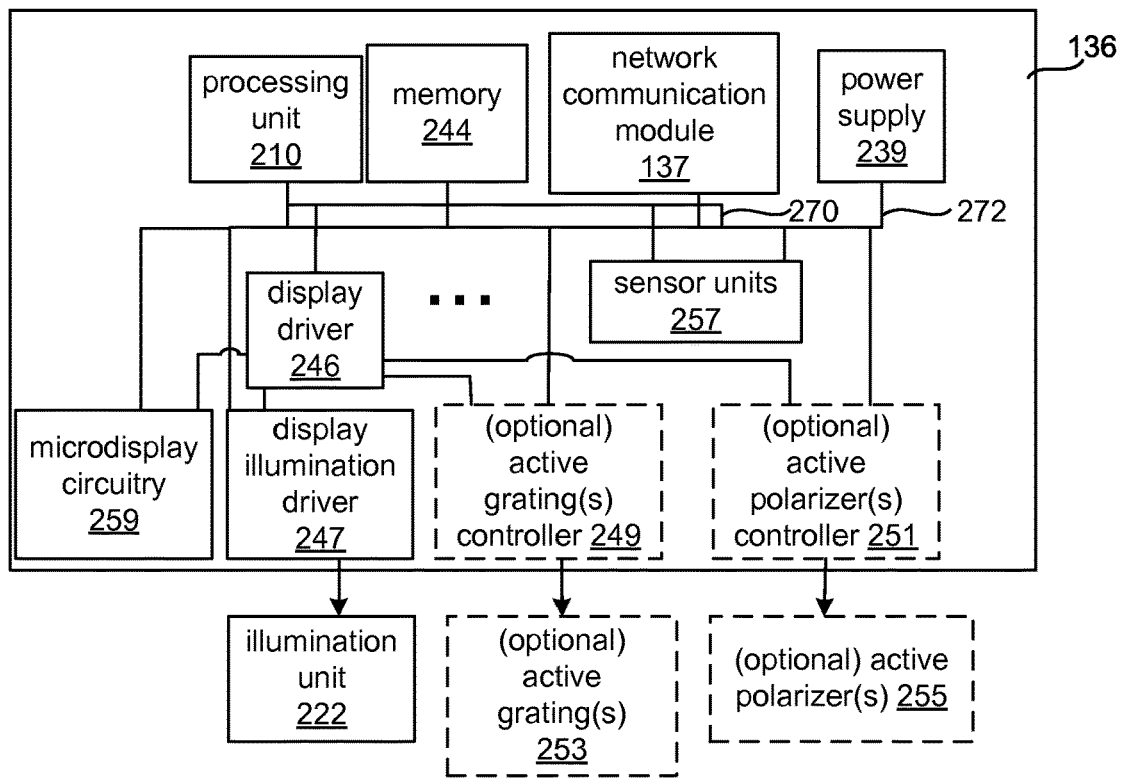
FIG. 2A is a block diagram of example hardware components in control circuitry of a NED device.

FIG. 2A is a block diagram of example hardware components including a computer system within control circuitry of a NED device. Control circuitry 136 provides various electronics that support the other components of HMD 2. In this example, the control circuitry 136 for a HMD 2 comprises a processing unit 210, a memory 244 accessible to the processing unit 210 for storing processor readable instructions and data, a network communication module 137 communicatively coupled to the processing unit 210 which can act as a network interface for connecting HMD 2 to another computer system such as the companion processing module 4, a computer system of another NED device or one which is remotely accessible over the Internet. A power supply 239 provides power for the components of the control circuitry 136 and the other components of the HMD 2 like the capture devices 113, the microphone 110, other sensor units, and for power drawing components for displaying image data on near-eye display 14 such as light sources and electronic circuitry associated with an image source like a microdisplay in a projection light engine.

The processing unit 210 may comprise one or more processors (or cores) such as a central processing unit (CPU) or core and a graphics processing unit (GPU) or core. In embodiments without a separate companion processing module 4, processing unit 210 may contain at least one GPU. Memory 244 is representative of the various types of memory which may be used by the system such as random access memory (RAM) for application use during execution, buffers for sensor data including captured image data and display data, read only memory (ROM) or Flash memory for instructions and system data, and other types of nonvolatile memory for storing applications and user profile data, for example. FIG. 2A illustrates an electrical connection of a data bus 270 that connects sensor units 257, display driver 246, processing unit 210, memory 244, and network communication module 137. Data bus 270 also derives power from power supply 239 through a power bus 272 to which all the illustrated elements of the control circuitry are connected for drawing power.

Figure 2B:
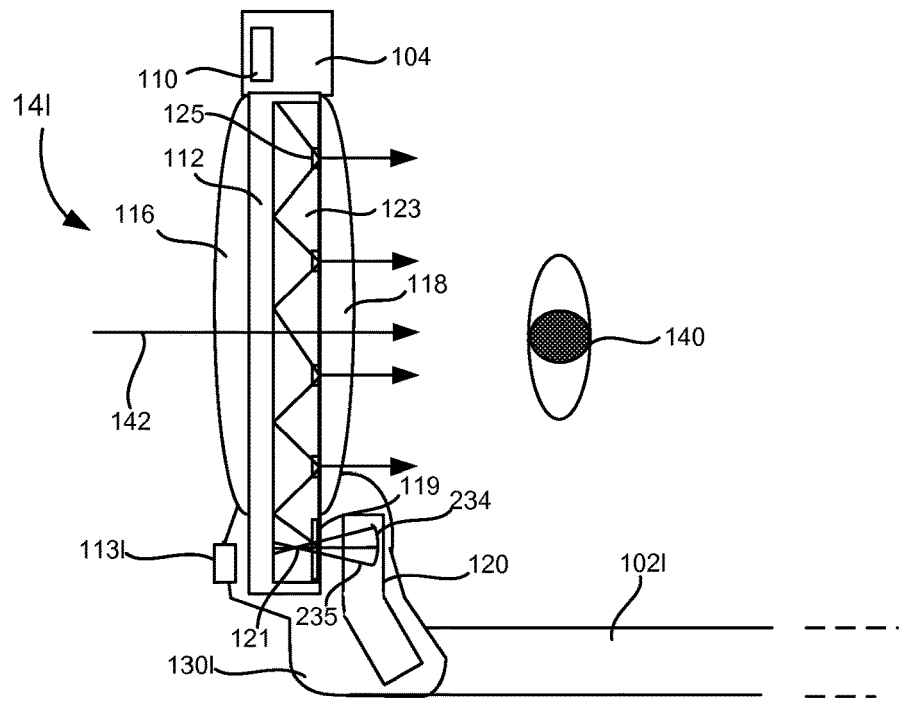
FIG. 2B is a top view of an embodiment of a near-eye display being coupled with a projection light engine having an external exit pupil.

Control circuitry 136 further comprises a display driver 246 for selecting digital control data (e.g. control bits) to represent image data that may be decoded by microdisplay circuitry 259 and different active component drivers of a projection light engine (e.g. 120 in FIG. 2B). A microdisplay, such as microdisplay 230 shown in FIG. 3D, may be an active transmissive, emissive or reflective device. For example, a microdisplay may be a liquid crystal on silicon (LCoS) device requiring power or a micromechanical machine (MEMs) based device requiring power to move individual mirrors. An example of an active component driver is a display illumination driver 247 which converts digital control data to analog signals for driving an illumination unit 222 which includes one or more light sources, such as one or more lasers or light emitting diodes (LEDs). In some embodiments, a display unit may include one or more active gratings 253, such as for a waveguide, for coupling the image light at the exit pupil from the projection light engine. An optional active grating(s) controller 249 converts digital control data into signals for changing the properties of one or more optional active grating(s) 253. Similarly, one or more polarizers of a projection light engine may be active polarizer(s) 255 which may be driven by an optional active polarizer(s) controller 251. The control circuitry 136 may include other control units not illustrated here but related to other functions of a HMD 2 such as providing audio output, identifying head orientation and location information.

FIG. 2B is a top view of an embodiment of a near-eye display 141 being coupled with a projection light engine 120 having an external exit pupil 121. In order to show the components of the display optical system 14, in this case 141 for the left eye, a portion of the top frame section 117 covering the near-eye display 141 and the projection light engine 120 is not depicted. Arrow 142 represents an optical axis of the near-eye display 141.

In this embodiment, the near-eye displays 141 and 14r are optical see-through displays. In other embodiments, they can be video-see displays. Each display includes a display unit 112 illustrated between two optional see-through lenses 116 and 118 and including a waveguide 123. The optional lenses 116 and 118 are protective coverings for the display unit. One or both of them may also be used to implement a user's eyeglass prescription. In this example, eye space 140 approximates a location of a user's eye when HMD 2 is worn. The waveguide directs image data in the form of image light from a projection light engine 120 towards a user eye space 140 while also allowing light from the real world to pass through towards a user's eye space, thereby allowing a user to have an actual direct view of the space in front of HMD 2 in addition to seeing an image of a virtual feature from the projection light engine 120.

In this top view, the projection light engine 120 includes a birdbath optical element 234 illustrated as a curved surface. The curved surface provides optical power to the beams 235 of image light (also described as image light 235) it reflects, thus collimating them as well. Only one beam is labeled to prevent overcrowding the drawing. In some embodiments, the radius of curvature of the birdbath optical element is at least −38 millimeters (mm). The beams are collimated but come from different angles as they reflect from different points of the curved surface. Thus, the beams will cross and form the exit pupil 121 at the smallest cross-section of themselves.

Figure 3A:
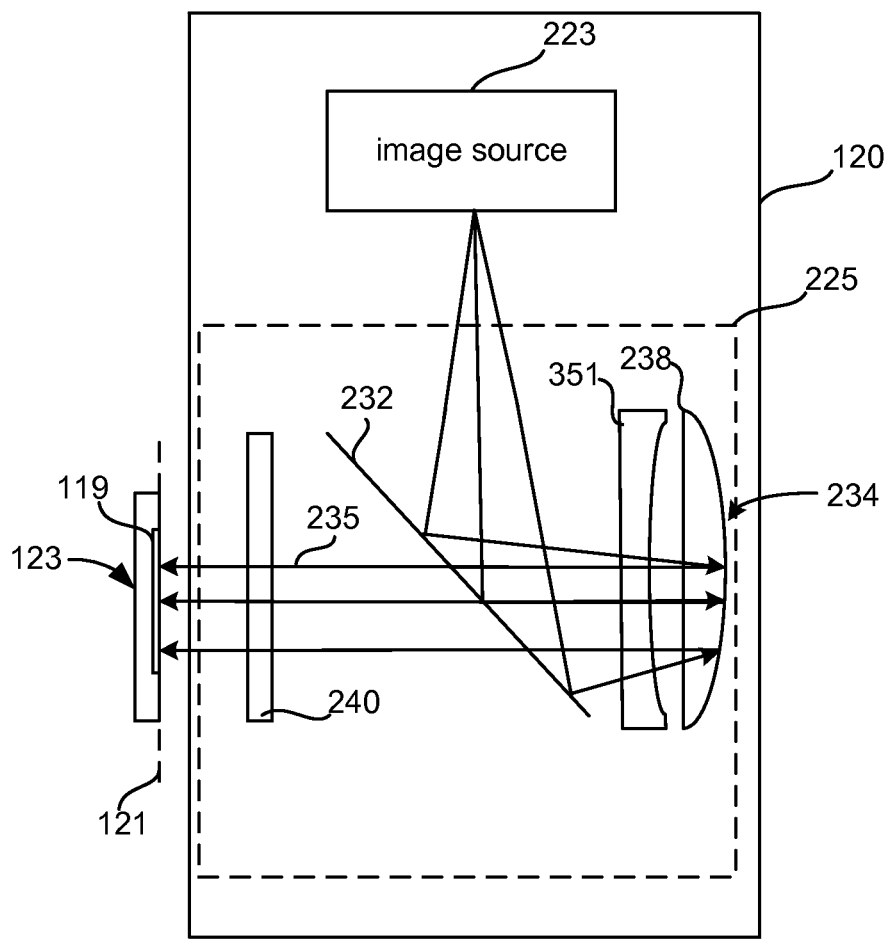
FIG. 3A is a block diagram of an embodiment of a projection light engine using a birdbath optical element and an aspheric optical element adjacent to the birdbath optical element.

In some embodiments, a waveguide 123 may be a diffractive waveguide. Additionally, in some examples, a waveguide 123 is a surface relief grating (SRG) waveguide. An input grating 119 couples an image light from a projection light engine 120. Additionally, a waveguide has a number of exit gratings 125 for an image light to exit the waveguide in the direction of a user eye space 140. One exit grating 125 is labeled to avoid overcrowding the drawing. In this example, an outermost input grating 119 is wide enough and positioned to capture light exiting a projection light engine 120 before the light exiting the projection light engine has reached its exit pupil 121. The optically coupled image light forms its exit pupil in this example at a central portion of the waveguide. See FIG. 3E for a more detailed example. FIG. 3A described herein provides an example of a waveguide coupling the image light at an exit pupil with an input grating positioned at the exit pupil.

The exit pupil 121 includes the light for the complete image being displayed, thus coupling light representing an image at the exit pupil 121 captures the entire image at once, and is thus very efficient and provides the user a view of the complete image in a near-eye display 14. An input grating 119 is able to couple an image light of an exit pupil 121 because the exit pupil 121 is external to the projection light engine 120. In an embodiment, an exit pupil 121 is 0.5 mm outside a projection light engine 120 or housing of the projection light engine. In other embodiments, the exit pupil 121 is projected 5 mm outside the projection light engine 120 or housing of the projection light engine.

In the illustrated embodiment of FIG. 2B, the projection light engine 120 in a left side housing 130l includes an image source, for example a microdisplay, which produces the image light and a projection optical system which folds an optical path of the image light to form an exit pupil 121 external to the projection light engine 120. The shape of the projection light engine 120 is an illustrative example adapting to the shape of the example of left side housing 130l which conforms around a corner of the frame 115 in FIG. 1 reducing bulkiness. The shape may be varied to accommodate different arrangements of the projection light engine 120, for example due to different image source technologies implemented.

There are different image generation technologies that can be used to implement an image source, such as image source 223 described herein. For example, a microdisplay can be implemented using a transmissive projection technology. In one example of such technology, a light source is modulated by optically active material and backlit with white light. These technologies are usually implemented using LCD type displays with powerful backlights and high optical energy densities. Other microdisplays use a reflective technology for which light from an illumination unit is reflected and modulated by an optically active material. The illumination maybe a white source or RGB source, depending on the technology. Digital light processing (DLP), digital micromirror device (DMD), LcOS and Mirasol® display technology from Qualcomm, Inc. are all examples of reflective technologies which are efficient as most energy is reflected away from the modulated structure and may be used by the display. Additionally, a microdisplay can be implemented using an emissive or self-emissive technology where light is generated by the display. An example of an emissive or self-emissive technology is organic light emitting diode (OLED) technology.

FIG. 2B shows half of a HMD 2. For the illustrated embodiment, a full HMD 2 may include another display optical system 14 with another set of optional see-through lenses 116 and 118, another waveguide 123, as well as another projection light engine 120, and another of outward facing capture devices 113. In some embodiments, there may be a continuous display viewed by both eyes, rather than a display optical system for each eye. In some embodiments, a single projection light engine 120 may be optically coupled to a continuous display viewed by both eyes or be optically coupled to separate displays for the eyes. Additional details of a head mounted personal A/V apparatus are illustrated in U.S. patent application Ser. No. 12/905,952 entitled Fusing Virtual Content Into Real Content, Filed Oct. 15, 2010.

FIG. 3A is a block diagram of an embodiment of a projection light engine 120 using a birdbath optical element 234 and aspheric optical element 351. In an embodiment, birdbath optical element 234 and aspheric optical element 351 are immersed in a high index glass region 225 which helps in folding the optical path to provide an exit pupil 121 external to the projection light engine. Some examples of high index glass are flint glass and glass having an index of refraction of at least 1.65. This side view illustrates some exemplary basic elements associated with a birdbath projection optical system. Additional optical elements may be present in various versions of the embodiment illustrated in FIG. 3A and in the other Figures. An image source 223 generates image light which propagates into a high index glass region 225 which includes an optical directing element 232, a birdbath optical element 234 with a curved reflective surface 238, aspheric optical element 351 and one or more polarizing optical elements represented by polarizer 240.

In an embodiment, birdbath optical element 234 is a spherical birdbath reflective mirror and aspheric optical element 351 is a Schmidt corrector lens or at least one aspheric lens disposed along an optical path between optical directing element 232 and birdbath optical element 234. Aspheric optical element 351 is used to correct optical aberrations in image light reflected from curved reflective surface 238. Decoupling aspheric optical elements from birdbath optical element 234 may provide many of the advantages described herein. In embodiments, projection light engine 120 shown in FIGS. 3A and 3C may provide low image distortion.

The optical directing element 232 directs the image light from the image source 223 to the reflective surface 238 of the birdbath optical element 234 (e.g. a spherical birdbath reflective mirror) and allows image light reflecting from the curved surface 238 to pass through and travel through polarizer 240. An example of the optical directing element 232 is a beam splitter, and the beam splitter may also act as a polarizer so the birdbath optical element 234 receives polarized light which is again polarized by one or more polarizing optical elements 240. Some implementation examples of the one or more polarizing optical elements 240 may be passive optical elements like a red rotation waveplate or a quarter waveplate. Active polarizers may be used in some embodiments as described herein.

The image light is polarized for more efficient coupling into one or more input gratings, such as the one or more input gratings of a diffractive waveguide. In some examples, a waveguide may have multiple layers, and the polarization of the incoming image light can be used for filtering the incoming light to different layers of the waveguide. Each layer has its own input grating and exit grating. An input grating for a layer couples light of a certain polarization into its layer. Light of other polarizations is passed through the input grating and the layer itself so that an input grating of the next layer either couples or passes the received light based on its polarization. In some implementations, different wavelength bands, such as for different colors, may be directed to different waveguide layers for enhancing brightness of the image. Light in the different wavelength bands may be polarized for coupling into a respective layer for each wavelength band. See for example, U.S. patent application Ser. No. 13/601,727 with a filing date of Aug. 31, 2012 entitled "NED Polarization System for Wavelength Pass-Through" to Nguyen et al.

The arrangement of one or more polarizing optical elements within the high index glass region 225 may be based on a number of factors including a number of layers in the waveguide 123, the types of gratings (e.g. surface relief gratings) and a predetermined criteria for distributing the image light among the layers. The beams 235 are collimated when reflected from the birdbath curved reflective surface 238, but each portion is reflecting from a different angle due to the curved surface. (See FIG. 3E for an example of a top view of multiple beams having their smallest cross-section at the exit pupil.) In this embodiment, an input grating 119 of a waveguide 123 couples the reflected beam at about an exit pupil location 121. In this embodiment, waveguide 123 may be a single layer waveguide. In other embodiments illustrated in FIGS. 3D-E, a multi-layer waveguide may be implemented in the near-eye display 14.

Figure 3B:
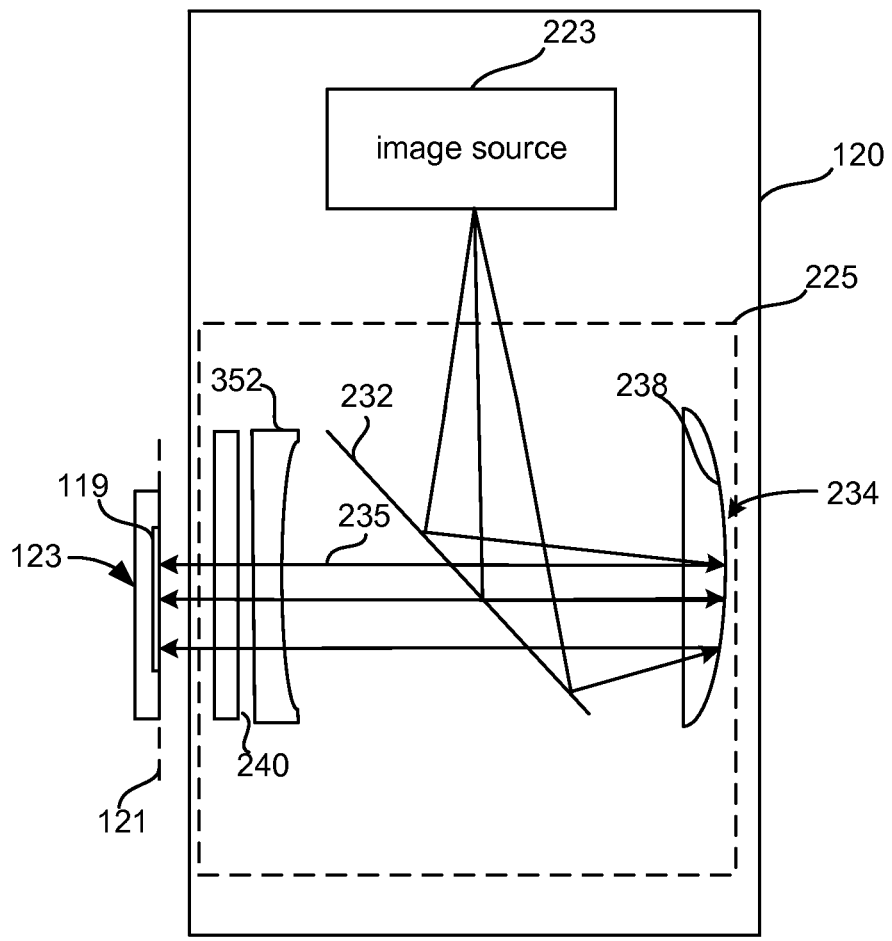
FIG. 3B is a block diagram of an embodiment of a projection light engine using a birdbath optical element and an aspheric optical element adjacent to a beam splitter.

FIG. 3B is a block diagram of another embodiment of a projection light engine 120 having similar components illustrated in FIG. 3A. However, FIG. 3B illustrates an embodiment where at least one aspheric optical element 352 is disposed along an optical path between optical directing element 232 and polarizer 240 in projection light engine 120. In an embodiment, aspheric optical element 352 may be at least one aspheric meniscus lens.

Figure 3C:
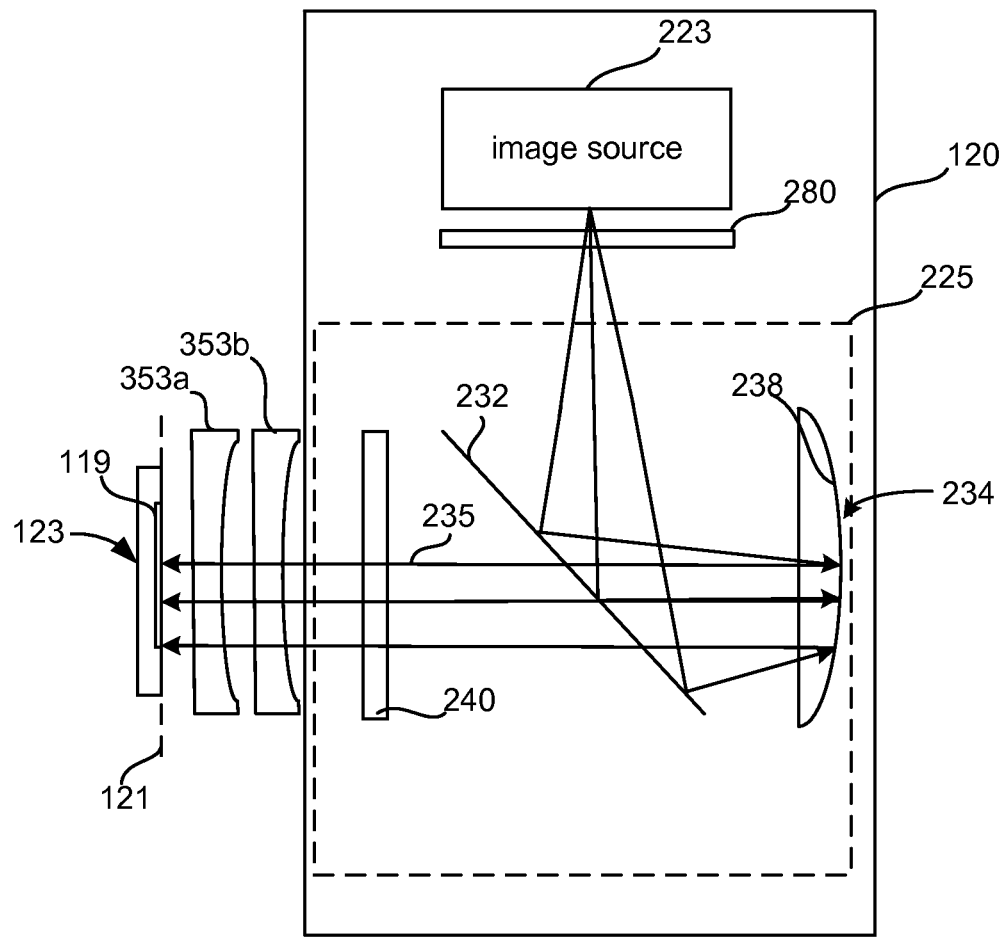
FIG. 3C is a block diagram of an embodiment of a projection light engine using a birdbath optical element and at least two aspheric meniscus lens.

FIG. 3C is a block diagram of another embodiment of a projection light engine 120 having similar components illustrated in FIGS. 3A-B. However, FIG. 3C illustrates an embodiment where aspheric optical elements 353a-b are disposed external to light projection engine 120 and along an optical path between birdbath optical element 234 and an exit pupil 121. In an embodiment, aspheric optical elements 353a-b are a set of aspheric meniscus lens. In another embodiment, a single aspheric optical element 353a is used. In an embodiment, a field corrector 280 is disposed between image source 223 and optical directing element 232. Similarly, embodiments illustrated in FIGS. 3A-C may also include a doublet (such as doublet 226 shown in FIG. 3D) disposed between image source 223 and optical directing element 232. In still another embodiment, a prepolarizer may be disposed between image source 223 and a doublet.

In alternate embodiments, a light projection engine 120 as shown in FIGS. 3A-D and F-G may have a birdbath optical element 234 disposed under optical directing element 232 (rather than to the right of optical directing element 232 as shown in FIGS. 3A-D and F-G). In such an embodiment, aspherical optical element 351 would likewise be disposed under optical directing element 232.

Figure 3D:
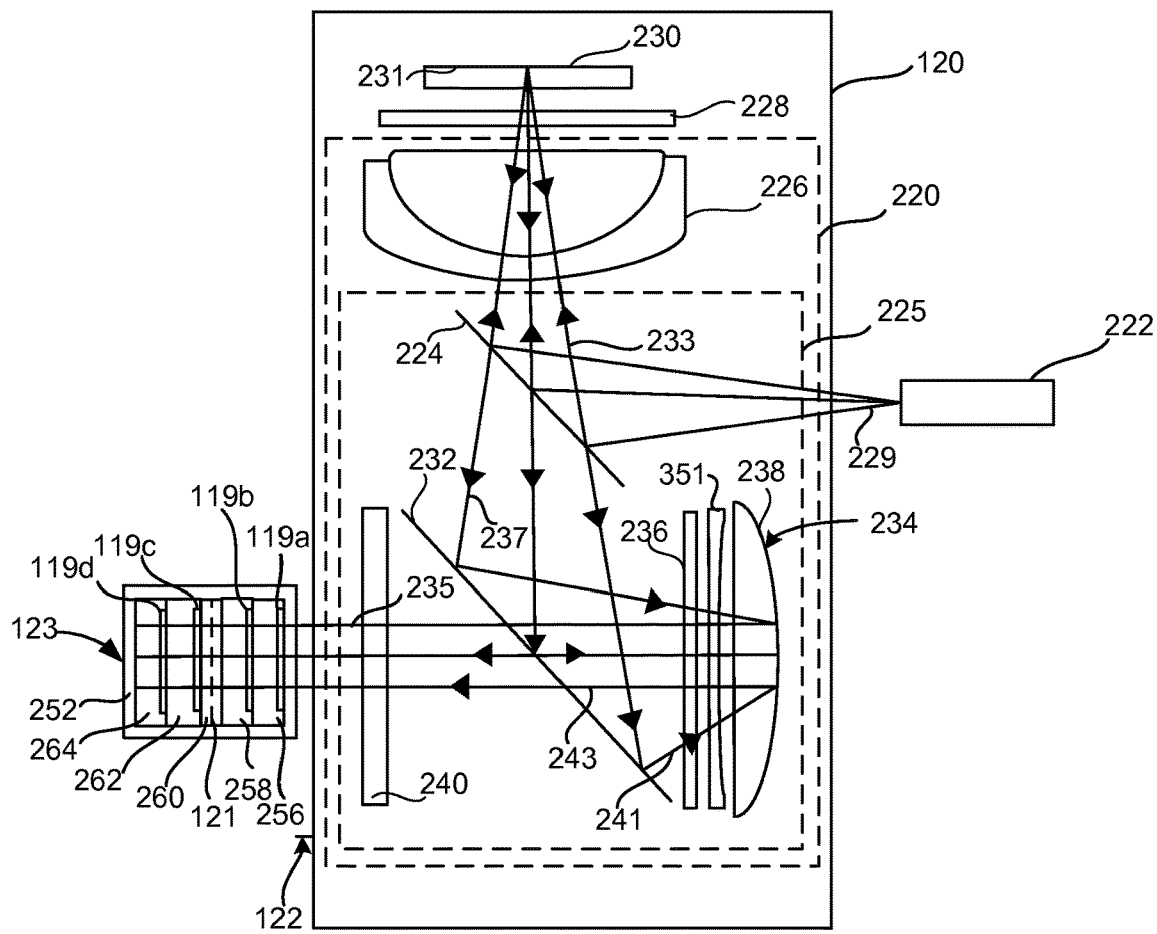
FIG. 3D is a block diagram of another embodiment of a projection light engine using a birdbath optical element and aspheric optical element immersed in high index glass.

FIG. 3D is a block diagram of another embodiment of a projection light engine 120 using a birdbath optical element 234 and aspheric optical element 351 immersed in high index glass. In this embodiment, high index glass having an index of refraction between 1.7 and 1.8 is used. In this embodiment, the projection light engine 120 includes an image source and a projection optical system 220. The image source is embodied as a reflective liquid crystal on silicon LCoS microdisplay 230 with an accompanying compensator optical element 228. In this embodiment, the microdisplay 230 has an LCoS surface 231 which reflects light from an illumination unit 222 for representing the image data to be displayed. The LCoS surface 231 polarizes light it reflects; however there may be polarization errors. A compensator optical element 228 is a polarization optical element whose compensation parameters may be determined during manufacture of the LCoS to compensate for polarization errors measured for the LCoS surface during manufacture.

The projection optical system 220 in this embodiment includes a doublet 226 outside a high index glass region 225 and a number of optical components within the high index glass region 225. The doublet 226 corrects for chromatic aberration and also provides some collimation to the image light reflecting off the LCoS surface 231. In an embodiment, doublet 226 may be a spherical doublet. Those optical elements comprise an illumination optical directing element embodied as a polarizing illumination beam splitter 224, another optical directing element embodied as a polarizing beam splitter 232, a quarter waveplate 236, a birdbath optical element 234 with a curved reflective surface 238, aspheric element 351 and another representative polarizer 240 embodied as including a red rotation waveplate 240. In other embodiments, like embodiments using a transmissive or emissive image source including its own illumination unit 222, besides omitting the doublet, the illumination beam splitter 224 may also be omitted from the projection optical system 220.

An optical path of light through these elements is discussed next. Different portions of the illumination light and image light are labeled with different numbers to facilitate discussing the progress of the light. To avoid overcrowding the drawing, only one representation ray of the beam is labeled at each stage of the path. Light 229 generated by the illumination unit 222 is directed to the polarizing illumination beam splitter 224 which directs the light 233 in the direction of the LCoS surface 231. While traveling to the surface 231, the illumination light passes through the doublet 226 and the compensator optical element 228. Some examples of illumination sources which the illumination unit 222 may include are light emitting diodes (LEDs) and lasers. In some embodiments, there may be separate red, green and blue (RGB) illumination sources, and in other embodiments, there may be a white light source and filters used to represent different colors.

In this embodiment, a color sequential LED device is used in the illumination unit 222. The color sequential device includes red, blue and green LEDs which are turned on in a sequential manner in timing with the LCoS for making a full color image. In other examples, lasers rather than LEDs may be used. Individual display elements on the LCoS surface 231 are controlled by the microdisplay circuitry 259 to reflect or absorb the red, green and blue light to represent the color or shade of gray for grayscale indicated by the display driver 246 for the image data.

The image light 237 polarized and reflected from the LCoS surface 231 and compensator 228 is collimated or increased in optical power by the doublet 226 due to its curved surfaces. The image light 237 enters the high index glass region 225, passes through the illumination beam splitter 224 and intercepts polarizing beam splitter 232 which directs the again polarized reflected light 241 through the quarter waveplate 236, which again passively alters the polarization state of the reflected light, to the curved reflective surface 238 of the birdbath optical element 234 which collimates and reflects the image light back through aspheric optical element 351 and the quarter waveplate 236 for another polarization state alteration. The quarter waveplate provides circular polarization while the polarizing beam splitters 224, 232 generally act as linear polarizers. The birdbath reflected, and twice quarter turned, image light 243 passes through aspheric optical element 351, beam splitter 232 and the polarization state is altered yet again by red rotation plate 240. The red rotation waveplate rotates the polarization state of red wavelengths through ninety (90) degrees. The image light 235 then exits projection light engine 120 for optical coupling into waveguide 123.

Figure 3E:
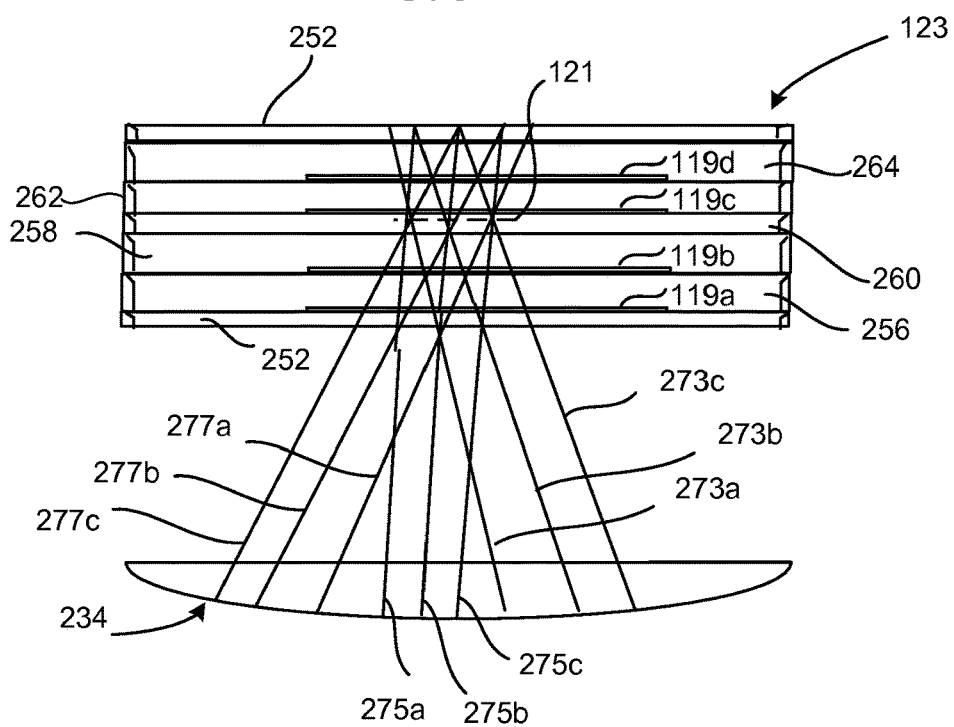
FIG. 3E is a block diagram illustrating a top view of layers of a waveguide example illustrated in FIG. 3D.
Figure 3F:
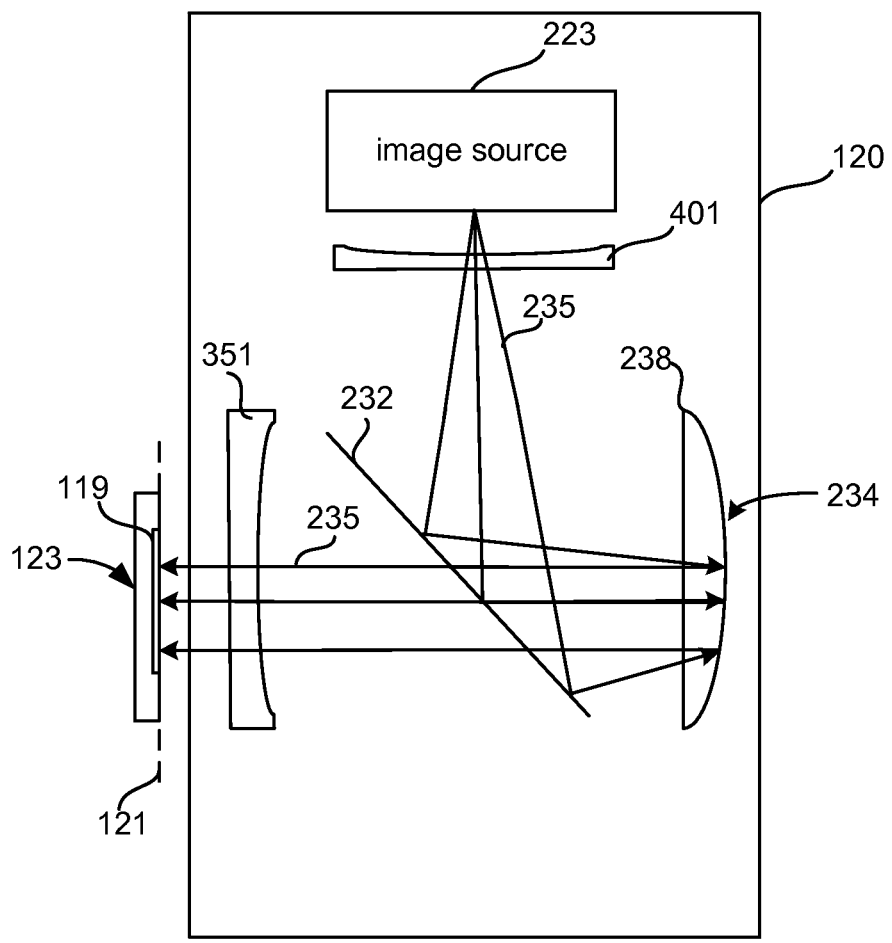
FIG. 3F is a block diagram of another embodiment of a projection light engine using a birdbath optical element, aspheric achromatic lens and aspheric meniscus lens.

FIG. 3F is a block diagram of another embodiment of a projection light engine using a birdbath optical element, aspheric achromatic lens and aspheric meniscus lens. In particular, FIG. 3B is a block diagram of another embodiment of a projection light engine 120 having similar components illustrated in FIG. 3A-C. However, FIG. 3F illustrates an embodiment where an aspheric optical element, such as aspheric achromatic lens 401, is disposed between image source 223 and optical directing element 232. In the illustrated embodiment, an aspheric optical element 351, such as an aspheric meniscus lens, is also disposed between optical directing element 232 and an external exit pupil 121. In an embodiment, aspheric optical element 351 is an aspheric meniscus lens. An optical aberration of image light 235 may be corrected by aspheric optical element 351 and/or aspheric achromatic lens 401.

In embodiments, optical directing element 232 is a type of beam splitter selected from a group consisting of cube, plate, wire-grid polarizer and internally refractive. For example, optical directing element 232 may be a cube beam splitter, plate beam splitter, wire-grid polarizer beam splitter or internally refractive beam splitter.

Figure 3G:
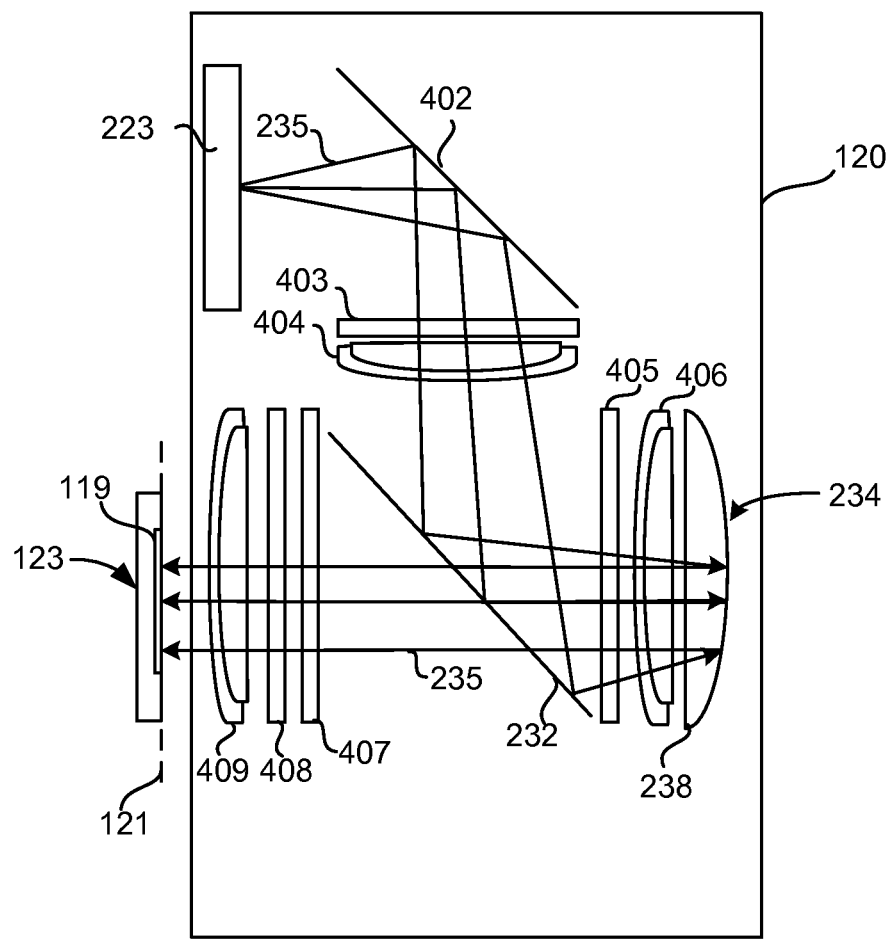
FIG. 3G is a block diagram of another embodiment of a projection light engine using a birdbath optical element and an aspheric meniscus doublet.

FIG. 3G is a block diagram of another embodiment of a projection light engine 120 using a birdbath optical element and an aspheric meniscus doublet. In an embodiment, an image source 223 provides image light 235 to an optical directing element 402. In an embodiment, optical directing element 402 directs image light 235 through polarizer 403 and achromatic doublet 404 to optical directing element 232. In an embodiment, optical directing elements 232 and 402 are beam splitters as described herein. Optical directing element 232 directs image light through quarter wave retarder 405 and doublet 406 to the reflective surface 238 of the birdbath optical element 234 (e.g. a spherical birdbath reflective mirror). The reflective surface 238 of birdbath optical element 234 then reflects image light 235 to pass and travel through a doublet 406, a quarter wave retarder 405, an optical directing element 232, a polarizer 407, a color selector 408 and an aspheric meniscus doublet 409 to external exit pupil 121. An optical aberration of image light 235 may be corrected by aspheric meniscus doublet 409. In an embodiment, polarizers 403 and 407 may include a polarizer as described herein. In embodiments, projection light engine 120 shown in FIGS. 3F-G includes high index glass as described herein.

As mentioned above, immersing optical elements in high index glass extends the optical path length enough to allow for folds that project the exit pupil to a point external to the projection light engine 120. Coupling light at the exit pupil within the waveguide significantly increases the efficiency of the light coupling, thus reducing power.

A cross-sectional side view of the waveguide 123 is shown in FIG. 3D. The waveguide 123 extends into the page and into the near-eye display 14 approximately parallel to the eye area 140 and extends a much smaller amount out of the page. In this embodiment, the waveguide 123 is multi-layered with four exemplary layers, 256, 258, 262 and 264, and a center waveplate 260, in this embodiment. Line 122 indicates a distance between the projection light engine 120 (or projection light engine housing) and the waveguide 123. FIG. 3D is not drawn to scale, but an example of such a distance between the projection light engine 120 and the waveguide 123 is about 0.5 mm. In center waveplate 260 is a target location for an exit pupil to be projected. In this embodiment, again not drawn to scale, the exit pupil is projected about 5 mm from the outside of the projection light engine 120 to the center waveplate 260 of the waveguide. Additionally, in this example, the waveguide 123 has an index of refraction about 1.7 which is in the range of high index glass.

In this embodiment, an outer protective covering 252 of see-through glass surrounds waveguide 123 through which the image light 235 passes. The waveguide 123 is positioned within housing 130 for optical coupling of the image light of the exit pupil 121 in the center waveplate 260. Each of the four layers has its own input grating. An example of an input grating is a surface relief grating manufactured as part of the surface of each layer in the waveguide 123. Layer 256 first receives the image light 235 which has exited the projection light engine 120 and couples that light through its optical input grating 119a. Similarly, layer 258 couples the image light 235 through its optical input grating 119b. The center waveplate layer 260 couples and changes the polarization state of the image light 235 it has received including the exit pupil. Layer 262 via optical input grating 119c couples the image light 235 as its cross section expands, and layer 264 couples the image light 235 with its optical grating 119d as the cross section of the image light 235 continues to expand.

FIG. 3E is a block diagram illustrating a top view of the four layers and the center waveplate of the waveguide 123 embodiment in FIG. 3D illustrated with a birdbath optical element 234 for reference (not drawn to scale). The intervening elements are not shown to more easily show the beams 273, 275 and 277. Each set of three rays (e.g. 273a, 273b, 273c) represents a beam (e.g. 273). Each beam may include light representing a plurality of colors. Each beam is collimated as described herein. As the beams reflect from different points on the curved surface, different portions of the beams, here illustrated as rays cross, and the narrowest cross section of the beams occurs at an exit pupil 121. In some examples, the exit pupil diameter is about 3.0 mm (again not drawn to scale).

Optical elements described herein may be made of glass or plastic material. Optical elements may be manufactured by molding, grinding and/or polishing. Optical elements may or may not be cemented to each other in embodiments. Optical elements described herein may be aspherical. In embodiments, single lens optical elements may be split into multiple lens elements. Better image quality may be achieved by replacing single lens optical elements with multiple lens optical elements so more lens are used and hence more properties are available to be varied to achieve a particular image quality.

Figure 4:
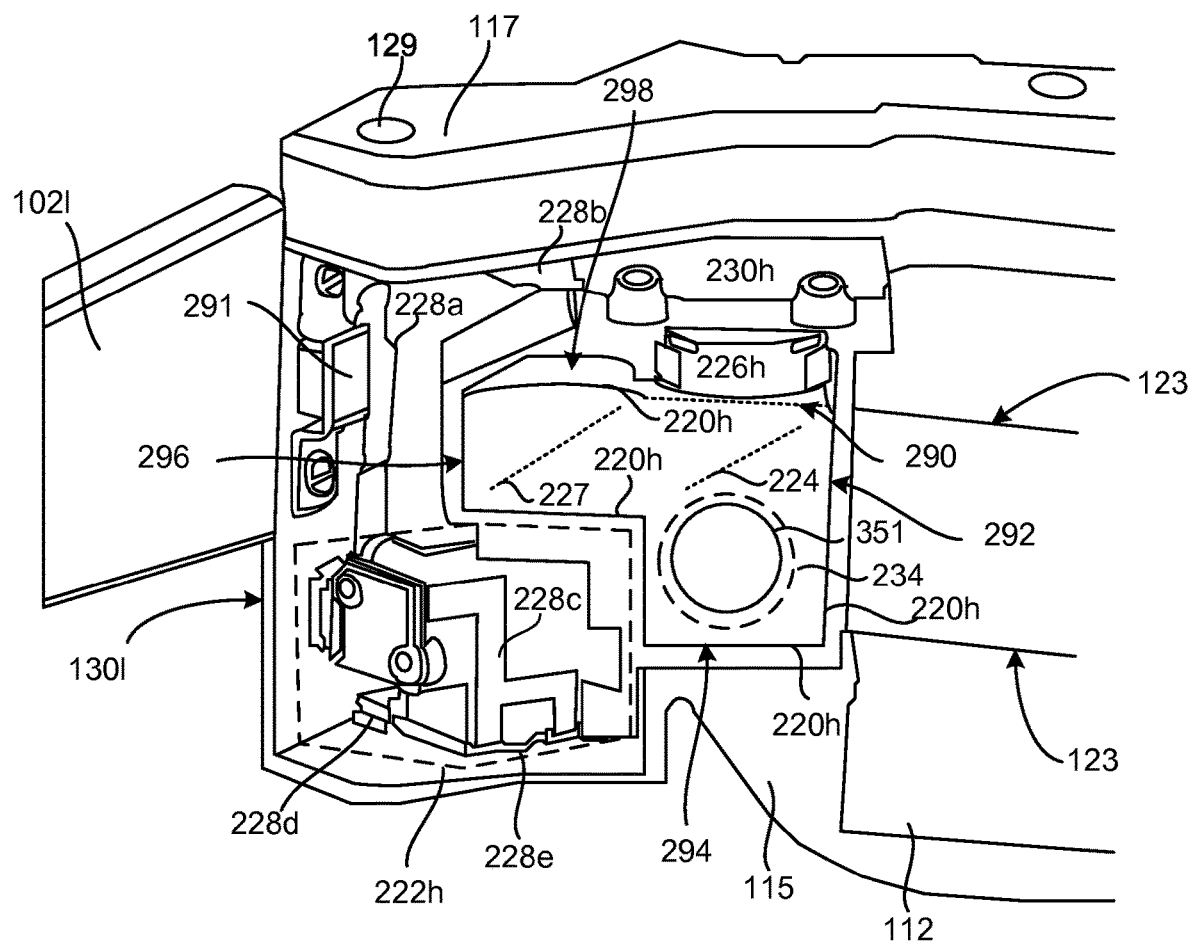
FIG. 4 illustrates an embodiment of a housing a projection light engine having an external exit pupil for optical coupling with a near-eye display in a NED device using an eyeglass frame.

FIG. 4 illustrates an embodiment of a left side housing 130l for positioning an embodiment of a projection light engine 120 with an external exit pupil for optical coupling with a near-eye display in a NED device using an eyeglass frame. The left side housing 130l is also referred to as the housing of a projection light engine. This view illustrates an example of how projection light engine components may be fitted within the left side housing 130l. In alternate embodiments, projection light engine components may be disposed in a different arrangement and/or orientation so as to fit a different sized housing. A protective covering is removed to see the exemplary arrangement.

The left side housing 130l is connected and adjacent to frame top section 117 and left side arm 102l as well as a portion of frame 115 surrounding a left side display unit 112. In this example, a power supply feed 291 is located on the upper left interior of left side housing 130l providing power from power supply 239 for various components. Throughout left side housing 130l are various exemplary electrical connections 228 (228a, 228b, 228c, 228d, and 228e) for providing power as well as data representing instructions and values to the various components. An example of an electrical connection is a flex cable 228b which interfaces with the control circuitry 136 which may be inside the frame top section 117 as in FIG. 1 or elsewhere such as on or within a side arm 102.

Starting in the lower left is a housing structure 222h which encompasses components within the three dimensional space surrounded by the dashed line representing housing structure 222h. Housing structure 222h provides support and a protective covering for components of the illumination unit 222 (such as the one or more light sources of the unit 222) and at least display illumination driver 247. Display illumination driver 247 convert digital instructions to analog signals to drive one or more light sources like lasers or LEDs making up the illumination unit 222. Flex cable 228c also provides electrical connections. In this embodiment, the illumination is directed onto an optical directing element 227 (represented as a dashed line) such as a mirror, which is within an optical system housing 220h. Additional elements, like another polarizer, may follow between the optical directing element 227 and the illumination beam splitter 224 also (represented as a dashed line) within the optical system housing 220h.

The optical system housing 220h includes components of a projection optical system 220 such as the embodiments described herein. In this embodiment, optical system housing 220h below dashed line 290 extending to arrow 294 and including its section which extends slightly above the dashed line 290 as indicated by arrow 298 and which extends left as indicated by arrow 296, immerses the components in high index glass. In this view of the optical system housing 220h, the illumination reflected from optical directing element 227 is directed to the illumination beam splitter 224 which directs light through doublet 226 in the doublet housing 226h to an LCoS chip 230 positioned by chip housing 230h which is disposed above doublet 226. The light reflected from the LCoS chip 230 (as in the embodiment illustrated by FIG. 3D) is polarized and reflected to the birdbath optical element 234 (shown as a dashed line circle in FIG. 4). The back of the curved reflective surface 238 of the birdbath optical element 234 is facing out of the page in this view. The reflected image light is reflected through aspheric optical element 351 (shown as a solid line circle in FIG. 4 and not to scale) into the page where a portion of the waveguide 123 (not shown) with one or more input gratings extends to the left of the display unit 112 and behind optical system housing 220h in this view in order to couple the image light of the external exit pupil 121 (not shown).

In some embodiments, the distance from the top of the chip housing 230h to the vertical bottom of optical system housing 220h indicated by arrow 294 is within 20 millimeters. In an embodiment, such distance is about 17 mm. The components arranged in such an embodiment include the LCoS 230, compensator 228, doublet 226, illumination beam splitter 224, the polarizing beam splitter 232, the birdbath optical element 234, aspheric optical element 351 and the polarizers 236 and 240 (as arranged in the embodiment of FIG. 3D). Additionally, optical system housing 220h from its leftmost side 296 to the right side at arrow 292 extends within about 30 millimeters in an embodiment.

In alternate embodiments, the electronics and optical elements shown in FIG. 4 (or described herein) may be disposed in an alternative orientation or arrangement with one or more different or combined supporting housings and/or structures. In alternate embodiments, other aspheric elements and/or aspheric meniscus lens, as described herein and/or illustrated in FIGS. 3A-D and 3F-G, may be disposed in left side housing 130l and/or external to left side housing 130l.

Figure 5:
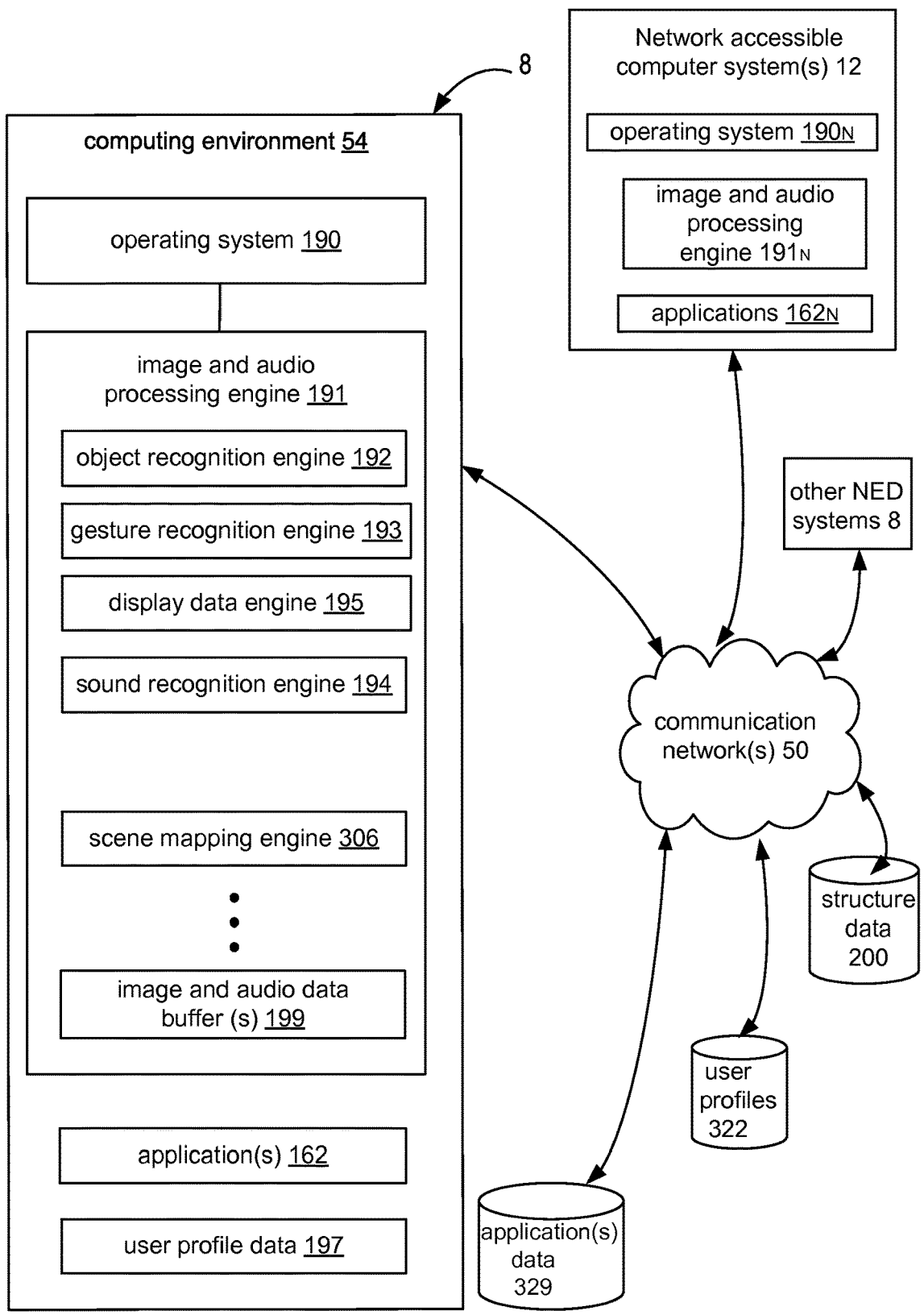
FIG. 5 is a block diagram of an embodiment of a system from a software perspective for displaying image data by a NED device.

FIG. 5 is a block diagram of an embodiment of a system from a software perspective for displaying image data or light (such as a computer generated image (CGI)) by a near-eye display device. FIG. 5 illustrates an embodiment of a computing environment 54 from a software perspective which may be implemented by a system like NED system 8, network accessible computing system(s) 12 in communication with one or more NED systems or a combination thereof. Additionally, a NED system can communicate with other NED systems for sharing data and processing resources.

As described herein, an executing application determines which image data is to be displayed, some examples of which are text, emails, virtual books or game related images. In this embodiment, an application 162 may be executing on one or more processors of the NED system 8 and communicating with an operating system 190 and an image and audio processing engine 191. In the illustrated embodiment, a network accessible computing system(s) 12 may also be executing a version 162N of the application as well as other NED systems 8 with which it is in communication for enhancing the experience.

Application 162 includes a game in an embodiment. The game may be stored on a remote server and purchased from a console, computer, or smartphone in embodiments. The game may be executed in whole or in part on the server, console, computer, smartphone or on any combination thereof. Multiple users might interact with the game using standard controllers, computers, smartphones, or companion devices and use air gestures, touch, voice, or buttons to communicate with the game in embodiments.

Application(s) data 329 for one or more applications may also be stored in one or more network accessible locations. Some examples of application(s) data 329 may be one or more rule data stores for rules linking action responses to user input data, rules for determining which image data to display responsive to user input data, reference data for natural user input like for one or more gestures associated with the application which may be registered with a gesture recognition engine 193, execution criteria for the one or more gestures, voice user input commands which may be registered with a sound recognition engine 194, physics models for virtual objects associated with the application which may be registered with an optional physics engine (not shown) of the image and audio processing engine 191, and object properties like color, shape, facial features, clothing, etc. of the virtual objects and virtual imagery in a scene.

As shown in FIG. 5, the software components of a computing environment 54 comprise the image and audio processing engine 191 in communication with an operating system 190. The illustrated embodiment of an image and audio processing engine 191 includes an object recognition engine 192, gesture recognition engine 193, display data engine 195, a sound recognition engine 194, and a scene mapping engine 306. The individual engines and data stores provide a supporting platform of data and tasks which an application(s) 162 can leverage for implementing its one or more functions by sending requests identifying data for processing and receiving notification of data updates. The operating system 190 facilitates communication between the various engines and applications. The operating system 190 makes available to applications which objects have been identified by the object recognition engine 192, gestures the gesture recognition engine 193 has identified, which words or sounds the sound recognition engine 194 has identified, and the positions of objects, real and virtual from the scene mapping engine 306.

The computing environment 54 also stores data in image and audio data buffer(s) 199 which provide memory for image data and audio data which may be captured or received from various sources as well as memory space for image data to be displayed. The buffers may exist on both the NED, e.g. as part of the overall memory 244, and may also exist on the companion processing module 4.

In many applications, virtual data (or a virtual image) is to be displayed in relation to a real object in the real environment. The object recognition engine 192 of the image and audio processing engine 191 detects and identifies real objects, their orientation, and their position in a display FOV based on captured image data and captured depth data from outward facing image capture devices 113 if available or determined depth positions from stereopsis based on the image data of the real environment captured by the capture devices 113. The object recognition engine 192 distinguishes real objects from each other by marking object boundaries, for example using edge detection, and comparing the object boundaries with structure data 200. Besides identifying the type of object, an orientation of an identified object may be detected based on the comparison with stored structure data 200. Accessible over one or more communication networks 50, structure data 200 may store structural information such as structural patterns for comparison and image data as references for pattern recognition. Reference image data and structural patterns may also be available in user profile data 197 stored locally or accessible in Cloud based storage.

The scene mapping engine 306 tracks the three dimensional (3D) position, orientation, and movement of real and virtual objects in a 3D mapping of the display FOV. Image data is to be displayed in a user's FOV or in a 3D mapping of a volumetric space about the user based on communications with the object recognition engine 192 and one or more executing application(s) 162 causing image data to be displayed.

An application(s) 162 identifies a target 3D space position in the 3D mapping of the display FOV for an object represented by image data and controlled by the application. For example, the helicopter shoot down application identifies changes in the position and object properties of the helicopters based on the user's actions to shoot down the virtual helicopters. The display data engine 195 performs translation, rotation, and scaling operations for display of the image data at the correct size and perspective. The display data engine 195 relates the target 3D space position in the display field of view to display coordinates of the display unit 112. For example, the display data engine may store image data for each separately addressable display location or area (e.g. a pixel, in a Z-buffer and a separate color buffer). The display driver 246 translates the image data for each display area to digital control data instructions for microdisplay circuitry 259 or the display illumination driver 247 or both for controlling display of image data by the image source.

The technology described herein may be embodied in other specific forms or environments without departing from the spirit or essential characteristics thereof. Likewise, the particular naming and division of modules, engines routines, applications, features, attributes, methodologies and other aspects are not mandatory, and the mechanisms that implement the technology or its features may have different names, divisions and/or formats.

The technology described herein may be embodied in a variety of operating environments. For example, NED system 8 and/or network accessible computing system(s) 12 may be included in an Internet of Things (IoT) embodiment. The IoT embodiment may include a network of devices that may have the ability to capture information via sensors. Further, such devices may be able to track, interpret, and communicate collected information. These devices may act in accordance with user preferences and privacy settings to transmit information and work in cooperation with other devices. Information may be communicated directly among individual devices or via a network such as a local area network (LAN), wide area network (WAN), a "cloud" of interconnected LANs or WANs, or across the entire Internet. These devices may be integrated into computers, appliances, smartphones wearable devices, implantable devices, vehicles (e.g., automobiles, airplanes, and trains), toys, buildings, and other objects.

The technology described herein may also be embodied in a Big Data or Cloud operating environment as well. In a Cloud operating environment, information including data, images, engines, operating systems, and/or applications described herein may be accessed from a remote storage device via the Internet. In an embodiment, a modular rented private cloud may be used to access information remotely. In a Big Data operating embodiment, data sets have sizes beyond the ability of typically used software tools to capture, create, manage, and process the data within a tolerable elapsed time. In an embodiment, image data may be stored remotely in a Big Data operating embodiment.

Figure 6A:
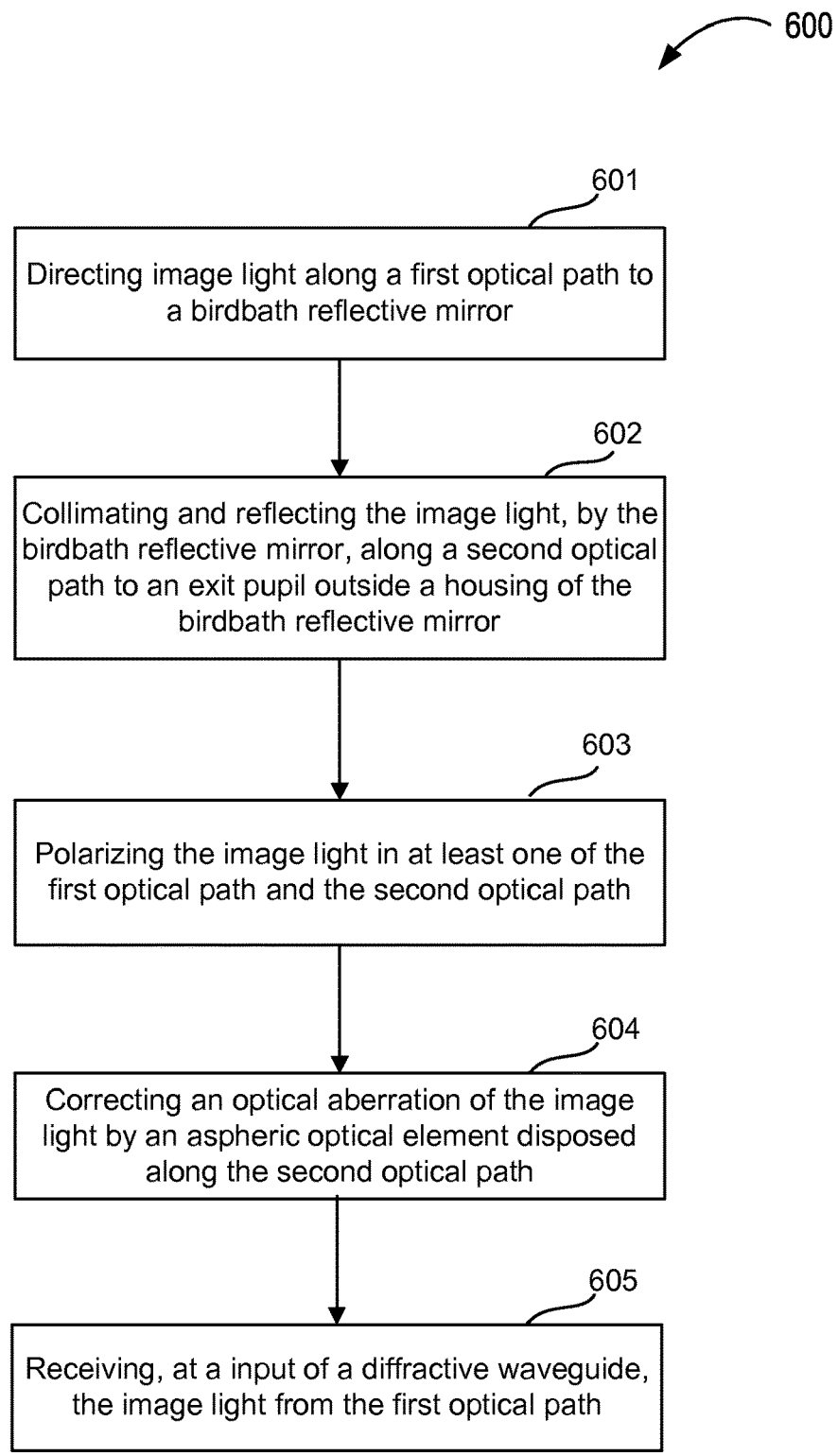
FIGS. 6A-B are flowcharts of embodiments of methods for operating a NED device and/or NED device system.
Figure 6B:
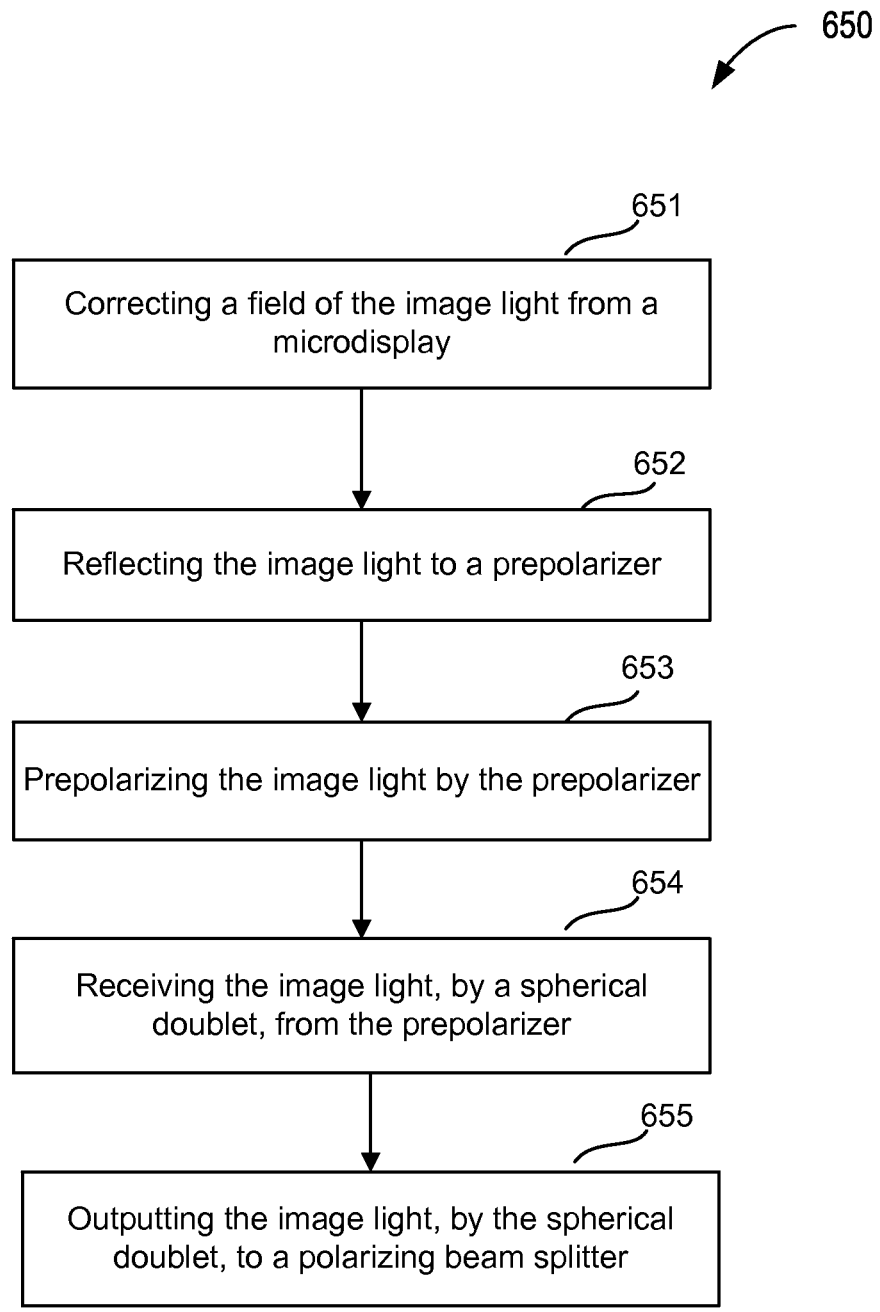

FIGS. 6A-B are flowcharts of embodiment of methods for operating a NED device and/or system. The steps illustrated in FIGS. 6A-B may be performed by optical elements, hardware components and software components, singly or in combination. For illustrative purposes, the method embodiments below are described in the context of the system and apparatus embodiments described above. However, the method embodiments are not limited to operating in the system embodiments described herein and may be implemented in other system embodiments. Furthermore, the method embodiments may be continuously performed while the NED system is in operation and an applicable application is executing.

Step 601, of method 600, begins by directing image light along a first optical path to a birdbath reflective mirror. In an embodiment, image light is directed to birdbath optical element 234 as illustrated in FIGS. 3A-E and F-G. As in the embodiments illustrated in FIGS. 3A-G, a beam splitter may be used in performing at least a portion of step 601.

Step 602 illustrates collimating and reflecting the image light, by the birdbath reflective mirror, along a second optical path to an exit pupil outside a housing of the birdbath reflective mirror. In an embodiment, birdbath optical element 234 performs at least a portion of step 602.

Step 603 illustrates polarizing the image light in at least one of the first optical path and the second optical path. In an embodiment, at least one of the polarizers illustrated in FIGS. 3A-GD or described herein perform step 603.

Step 604 illustrates correcting an optical aberration of the image light by an aspheric optical element disposed along the second optical path. In an embodiment, one or more aspheric optical elements 351-352 and/or one or more aspheric optical lens 353a-b may perform step 604. In an embodiment, steps 601-604 are performed by a projection light engine of a NED device, such as projection light engine 120.

Step 605 illustrates receiving, at an input of a diffractive waveguide, the image light from the first optical path. In an embodiment, step 605 is performed by a near-eye display of a NED device, such as near-eye display 14.

In an embodiment, method 650 of FIG. 6B illustrates an embodiment of step 601 shown in FIG. 6A. In particular, step 651 illustrates correcting a field of the image light from a microdisplay. In an embodiment, a field corrector as described herein performs at least a portion of step 651.

Step 652 illustrates reflecting the image light to a prepolarizer. In an embodiment, a prepolarizer as described herein performs at least a portion of step 653.

Step 653 illustrates prepolarizing the image light by the prepolarizer. In an embodiment, a prepolarizer as described herein performs at least a portion of step 653.

Step 654 illustrates receiving the image light, by a spherical doublet, from the prepolarizer. In an embodiment, doublet 226 performs step 654.

Step 655 illustrates outputting the image light, by the spherical doublet, to a polarizing beam splitter.

FIG. 7 is a block diagram of one embodiment of an exemplary computer system 900 that can be used to implement a network accessible computing system(s) 12, a companion processing module 4, or another embodiment of control circuitry 136 of a HMD 2. Computer system 900 may host at least some of the software components of computing environment 54. In an embodiment, computer system 900 may include a Cloud server, server, client, peer, desktop computer, laptop computer, hand-held processing device, tablet, smartphone and/or wearable computing/processing device.

In its most basic configuration, computer system 900 typically includes one or more processing units (or cores) 902 or one or more central processing units (CPU) and one or more graphics processing units (GPU). Computer system 900 also includes memory 904. Depending on the exact configuration and type of computer system, memory 904 may include volatile memory 905 (such as RAM), non-volatile memory 907 (such as ROM, flash memory, etc.) or some combination thereof. This most basic configuration is illustrated in FIG. 7 by dashed line 906.

Additionally, computer system 900 may also have additional features/functionality. For example, computer system 900 may also include additional storage (removable and/or non-removable) including, but not limited to, magnetic or optical disks or tape. Such additional storage is illustrated in FIG. 7 by removable storage 908 and non-removable storage 910.

Alternatively, or in addition to processing unit(s) 902, the functionally described herein can be performed or executed, at least in part, by one or more other hardware logic components. For example, and without limitation, illustrative types of hardware logic components that can be used include Field-programmable Gate Arrays (FPGAs), Program Application-specific Integrated Circuits (ASICs), Program Application-specific Standard Products (ASSPs), System-on-a-chip systems (SOCs), Complex Programmable Logic Devices (CPLDs) and other like type of hardware logic components.

Computer system 900 may also contain communication module(s) 912 including one or more network interfaces and transceivers that allow the device to communicate with other computer systems. Computer system 900 may also have input device(s) 914 such as keyboard, mouse, pen, microphone, touch input device, gesture recognition device, facial recognition device, tracking device or similar input device. Output device(s) 916 such as a display, speaker, printer, or similar output device may also be included.

A user interface (UI) software component to interface with a user may be stored in and executed by computer system 900. In an embodiment, computer system 900 stores and executes a natural language user interface (NUI) and/or 3D UI. Examples of NUIs include using speech recognition, touch and stylus recognition, gesture recognition both on screen and adjacent to the screen, air gestures, head and eye tracking, voice and speech, vision, touch, hover, gestures, and machine intelligence. Specific categories of NUI technologies include for example, touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which may provide a more natural interface, as well as technologies for sensing brain activity using electric field sensing electrodes (EEG and related methods).

A UI (including a NUI) software component may be at least partially executed and/or stored on a local computer, tablet, smartphone, NED device system. In an alternate embodiment, a UI may be at least partially executed and/or stored on server and sent to a client. The UI may be generated as part of a service, and it may be integrated with other services, such as social networking services.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computer.

ASPECTS OF CERTAIN EMBODIMENTS

One or more embodiments include an apparatus comprising a display to provide image light to a beam splitter that splits the image light. A birdbath optical element receives the image light from the beam splitter and reflects as well as collimates the image light. At least one aspheric optical element is disposed in an optical path between the birdbath optical element and an exit pupil to correct an aberration in the image light.

In an apparatus embodiment, the birdbath optical element is a birdbath spherical mirror that collimates image light to an external pupil. The aspheric optical element includes a first and second aspheric meniscus lens that are disposed between the spherical birdbath mirror and the external exit pupil. In another embodiment, the aspheric optical element is an aspheric meniscus lens disposed between the beam splitter and the birdbath spherical mirror.

In an embodiment, the apparatus further comprises a quarter wave retarder disposed between the birdbath optical element and the beam splitter as well as a color select filter disposed between the beam splitter and the external exit pupil. The aspheric optical element includes an aspheric meniscus doublet and the birdbath optical element may be a spherical birdbath mirror. A doublet is disposed between the birdbath optical element and the beam splitter. The display includes a microdisplay. The beam splitter is a type of beam splitter selected from a group consisting of cube, plate, wire-grid polarizer and internally refractive. The aspheric meniscus doublet is disposed between the beam splitter and the external exit pupil.

In an embodiment, the apparatus further comprises an illumination unit including at least one light source. The microdisplay outputs the image light by reflecting light from the at least on light source. In an alternate embodiment, the apparatus further comprises a microdisplay that is a self-emissive microdisplay.

In an embodiment, the apparatus further comprises at least one polarizer to polarize the image light. In an embodiment, the at least one polarizer is included with the beam splitter.

In an embodiment, the apparatus further comprises a reflective surface to reflect the image light from the microdisplay to the beam splitter, a spherical doublet disposed between the reflective surface and the beam splitter, a prepolarizer disposed between the spherical doublet and the reflective surface, and a field corrector disposed between the microdisplay and the reflective surface.

In an embodiment, the apparatus is included in projection light engine of a near-eye display device. The near-eye display device includes the projection light engine and a near-eye display that includes a waveguide. In an embodiment, the projection light engine is included in a housing. The projection light engine outputs the image light at an exit pupil that is external to the housing.

One or more embodiments include a method comprising directing image light along a first optical path to a birdbath reflective mirror. A birdbath reflective mirror collimates and reflects the image light along a second optical path to an exit pupil outside a housing of the birdbath reflective mirror. The image light is polarized in at least one of the first optical path and the second optical path. An optical aberration of the image light is corrected by an aspheric optical element disposed along the second optical path.

In an embodiment, the method further comprises receiving, at an input of a diffractive waveguide, the image light from the first optical path.

In an embodiment, polarizing the image light is performed at least in part by a polarizing beam splitter. The aspheric optical element includes a first aspheric lens and a second aspheric lens which are disposed along the second optical path between the polarizing beam splitter and the exit pupil.

In an embodiment, polarizing the image light is performed at least in part by a polarizing beam splitter. The aspheric optical element is an aspheric lens which is disposed along the second optical path between the birdbath reflective mirror and the polarizing beam splitter.

In an embodiment, the directing image light along the first optical path to the birdbath reflective mirror comprises correcting a field of the image light from a microdisplay, reflecting the image light to a prepolarizer and prepolarizing the image light by the prepolarizer.

In an embodiment, the directing image light along the first optical path to the birdbath reflective mirror comprises receiving the image light, by a spherical doublet, from the prepolarizer and outputting the image light, by the spherical doublet, to the polarizing beam splitter.

One or more apparatus embodiments includes a computing system and a head-mounted display having a near-eye display. An apparatus comprises a computer system that provides an electronic signal representing image data. A head-mounted display provides image data in response to the electronic signal. The head-mounted display includes a near-eye display device having a projection light engine and near-eye display. The projection light engine provides the image data in response to the electronic signal. A reflective surface in the projection light engine reflects the image data from the microdisplay. A polarizing beam splitter, also in the projection light engine, then polarizes and splits a beam of the image data from the reflective surface. A spherical birdbath mirror reflects and collimates the image data, from the polarizing beam splitter, to an exit pupil external to the projection light engine. An aspheric meniscus lens that may be in the projection light engine then correct the image data. The near-eye display includes a waveguide to receive the image data.

In an apparatus embodiment, the aspheric meniscus lens is disposed on an optical path between the spherical birdbath mirror and the polarizing beam splitter.

In another apparatus embodiment, the aspheric meniscus lens is one of two aspheric lens disposed on an optical path between the polarizing beam splitter and the near-eye display.

In an apparatus embodiment, the waveguide of the near-eye display is a diffractive waveguide.

In an apparatus embodiment, the waveguide of the near-eye display is a surface relief grating waveguide.

Embodiment described in the previous paragraphs may also be combined with one or more of the specifically disclosed alternatives.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:
1. An apparatus comprising:
 a display to provide an image light, wherein the display includes a microdisplay;
 a beam splitter to beam split the image light, wherein the beam splitter is a type of beam splitter selected from a group consisting of cube, plate, wire-grid polarizer and internally refractive;
 a spherical mirror to receive the image light from the beam splitter, wherein the spherical mirror reflects and collimates the image light;
 an aspheric meniscus lens, separate from the beam splitter and decoupled and spaced from the spherical mirror, to correct image distortion in the image light caused by surface errors on the spherical mirror, wherein the aspheric meniscus lens includes an aspheric meniscus doublet disposed between the beam splitter and an external exit pupil;
 a quarter wave retarder disposed between the aspheric meniscus lens and the beam splitter, wherein the image light passes through the aspheric meniscus lens and the quarter wave retarder after reflecting off the spherical mirror;
 a doublet disposed between the spherical mirror and the beam splitter; and
 a color select filter disposed between the beam splitter and the external exit pupil.
2. The apparatus of claim 1, wherein the aspheric meniscus lens includes a first and second aspheric meniscus lens, wherein the spherical mirror reflects and collimates the image light to the external exit pupil, and wherein the first and second aspheric meniscus lens are disposed between the spherical mirror and the external exit pupil.

3. The apparatus of claim 1, wherein the aspheric meniscus lens is disposed between the spherical mirror and the beam splitter.

4. The apparatus of claim 3, further comprising:
an illumination unit including at least one light source, wherein the microdisplay outputs the image light by reflecting light from the at least one light source.

5. The apparatus of claim 1, further comprising:
at least one polarizer to polarize the image light, wherein the microdisplay is a self-emissive microdisplay.

6. The apparatus of claim 1, wherein the apparatus is included in projection light engine of a near-eye display device, the near-eye display device includes the projection light engine and a near-eye display that includes a waveguide.

7. The apparatus of claim 6, wherein the projection light engine is included in a housing, wherein the projection light engine outputs the image light at the external exit pupil that is external to the housing.

8. A method comprising:
directing image light from an image source along a first optical path to a reflective mirror the image source including a microdisplay;
beam splitting, by a beam splitter, the image light, wherein the beam splitter is positioned in the first optical path;
collimating and reflecting the image light, by the reflective mirror, along a second optical path to an exit pupil outside a housing of the reflective mirror;
receiving the image light, by a spherical doublet disposed between the reflective mirror and the beam splitter along the first optical path;
prepolarizing the image light, by a prepolarizer disposed between the microdisplay and the spherical doublet along the first optical path; and
correcting, by an aspheric meniscus lens, an image distortion of the image light caused by surface errors on the reflective mirror, the aspheric meniscus lens disposed along the second optical path, the aspheric meniscus lens being decoupled and spaced from other elements, the image light passing through the aspheric meniscus lens after reflecting off of the reflective mirror.

9. The method of claim 8, comprising:
receiving, at an input of a diffractive waveguide, the image light from the first optical path.

10. The method of claim 8, further comprising:
polarizing the image light in at least one of the first optical path and the second optical path,
wherein polarizing the image light is performed at least in part by a polarizing beam splitter,
wherein the aspheric meniscus lens includes a first aspheric lens and a second aspheric lens, and
wherein the first aspheric lens and the second aspheric lens are disposed along the second optical path between the polarizing beam splitter and the exit pupil.

11. The method of claim 8, further comprising:
polarizing the image light in at least one of the first optical path and the second optical path,
wherein polarizing the image light is performed at least in part by a polarizing beam splitter, and
wherein the aspheric meniscus lens is disposed along the second optical path between the reflective mirror and the polarizing beam splitter.

12. The method of claim 11, wherein directing the image light along the first optical path to the reflective mirror comprises:
correcting a field of the image light from the microdisplay; and
reflecting the image light to the prepolarizer.

13. The method of claim 12 wherein directing the image light along the first optical path to the reflective mirror comprises:
outputting the image light, by the spherical doublet, to the polarizing beam splitter.

14. The apparatus of claim 1,
wherein the aspheric meniscus lens is disposed between the beam splitter and the external exit pupil.

15. An apparatus comprising:
a display to provide an image light, wherein the display includes a microdisplay;
a beam splitter to beam split the image light;
a reflective surface to reflect the image light from the microdisplay to the beam splitter;
a spherical doublet disposed between the reflective surface and the beam splitter;
a prepolarizer disposed between the spherical doublet and the microdisplay;
a field corrector disposed between the microdisplay and the reflective surface;
a spherical mirror to receive the image light from the beam splitter, wherein the spherical mirror reflects and collimates the image light; and
an aspheric meniscus lens to correct image distortion in the image light caused by surface errors on the spherical mirror, wherein the aspheric meniscus lens is disposed between the spherical mirror and the beam splitter, and wherein the aspheric meniscus lens is separate from the beam splitter and decoupled and spaced from the spherical mirror.

16. The apparatus of claim 15, wherein the apparatus is included in projection light engine of a near-eye display device, the near-eye display device includes the projection light engine and a near-eye display that includes a waveguide.

17. The apparatus of claim 16, wherein the projection light engine is included in a housing, wherein the projection light engine outputs the image light at an exit pupil that is external to the housing.

18. The apparatus of claim 15, further comprising:
at least one polarizer to polarize the image light.

19. The apparatus of claim 15, wherein the microdisplay is a self-emissive microdisplay.

20. The apparatus of claim 15, wherein the beam splitter is a polarizing beam splitter.

* * * * *